(12) United States Patent
Nishiyama et al.

(10) Patent No.: US 8,451,479 B2
(45) Date of Patent: May 28, 2013

(54) IMAGE FORMING APPARATUS AND PREVIEW DISPLAY METHOD

(75) Inventors: Haruo Nishiyama, Osaka (JP); Masanori Matsumoto, Osaka (JE)

(73) Assignee: Sharp Kabushiki Kaisha, Osaka (JP)

( * ) Notice: Subject to any disclaimer, the term of this patent is extended or adjusted under 35 U.S.C. 154(b) by 745 days.

(21) Appl. No.: 12/633,197

(22) Filed: Dec. 8, 2009

(65) Prior Publication Data

US 2010/0149590 A1    Jun. 17, 2010

(30) Foreign Application Priority Data

Dec. 16, 2008    (JP) .................................. 2008-319778

(51) Int. Cl.
| | |
|---|---|
| G06F 3/12 | (2006.01) |
| G06F 17/00 | (2006.01) |
| G06K 1/00 | (2006.01) |
| H04N 1/405 | (2006.01) |

(52) U.S. Cl.
USPC ........... 358/1.15; 358/1.9; 358/3.12; 715/246

(58) Field of Classification Search
None
See application file for complete search history.

(56) References Cited

U.S. PATENT DOCUMENTS

| | | | | |
|---|---|---|---|---|
| 6,281,983 | B1 * | 8/2001 | Takahashi et al. | 358/1.2 |
| 2005/0047659 | A1 | 3/2005 | Tanaka | |
| 2006/0103877 | A1 * | 5/2006 | Lee et al. | 358/1.15 |

FOREIGN PATENT DOCUMENTS

| | | |
|---|---|---|
| JP | 09-093378 | 4/1997 |
| JP | 2003-087454 | 3/2003 |
| JP | 2003-316628 | 11/2003 |
| JP | 2005-073015 | 3/2005 |
| JP | 2007-293654 | 11/2007 |
| JP | 2008-027378 | 2/2008 |
| JP | 2008-205921 | 9/2008 |

* cited by examiner

Primary Examiner — Thomas Lett
(74) Attorney, Agent, or Firm — Renner, Otto, Boisselle & Sklar, LLP

(57) ABSTRACT

Provided is an image forming apparatus capable of causing a user to get used to an operation of an apparatus while preventing from executing an unnecessary output by a preview display before outputting, and eliminating trouble of a preview display for a user skilled in the operation of the apparatus. The image forming apparatus (illustrated as a digital multi-functional peripheral) is provided with a setting storage portion (illustrated as a control memory) that stores, for each user, setting information related to a preview display (illustrated as a table) by a display controls portion (illustrated as a panel control portion). The setting information includes forcible execution information showing whether or not the preview image is forcibly displayed by the display control portion. The display control portion performs display control based on the stored setting information.

10 Claims, 14 Drawing Sheets

FIG. 8

| USER-BASED PREVIEW SETTING | | | | | END |
|---|---|---|---|---|---|
| SELECT FUNCTION OF PREVIEWING FOR EACH USER | | | | | |
| | COPY | FAX | FILING | MAIL SENDING | |
| AAA AAA | + | + | + | + | 1/25 |
| BBB BBB | ☐ | + | ☐ | + | ↑ |
| CCC CCC | * | ☐ | ☐ | ☐ | |
| DDD DDD | ☐ | ☐ | ☐ | ☐ | ↓ |
| GROUP K | + | + | + | + | |

FIG. 9

| | COPY | FAX | FILING | MAIL SENDING |
|---|---|---|---|---|
| USER AAA AAA | + | + | + | + |
| USER BBB BBB | − | + | − | + |
| USER CCC CCC | * | − | − | − |
| USER DDD DDD | − | − | − | − |
| GROUP K | + | + | + | + |
| GROUP L | − | + | − | + |
| ⋮ | ⋮ | ⋮ | ⋮ | ⋮ |

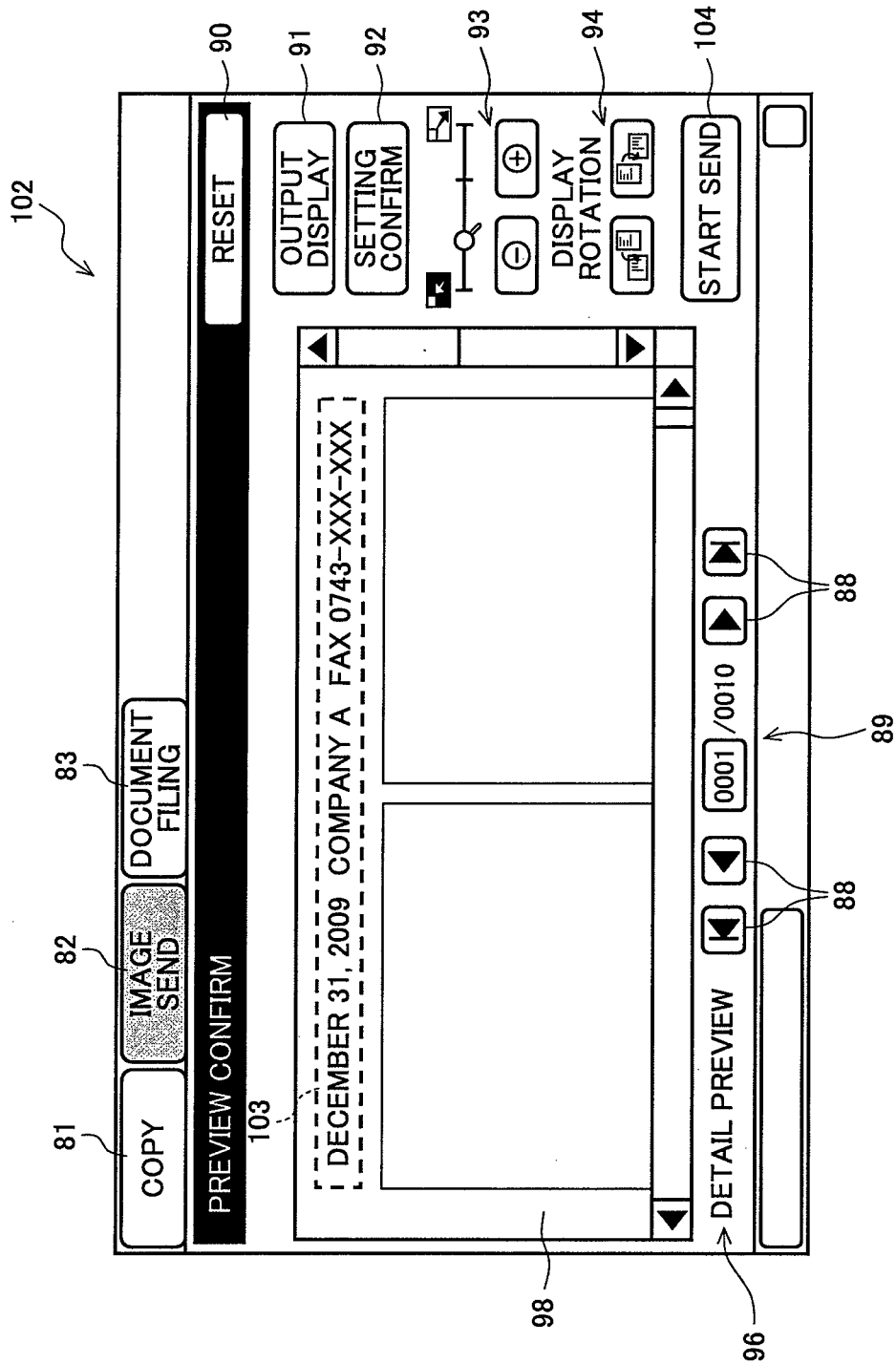

IMAGE FORMING APPARATUS AND PREVIEW DISPLAY METHOD

CROSS-NOTING PARAGRAPH

This non-provisional application claims priority under 35 U.S.C. §119(a) on Patent Application No. 2008-319778 filed in JAPAN on Dec. 16, 2008, the entire contents of which are hereby incorporated herein by reference.

FIELD OF THE INVENTION

The present invention relates to an image forming apparatus and a preview display method capable of displaying a preview of image data before outputting.

BACKGROUND OF THE INVENTION

Conventionally, some image forming apparatuses such as multi-functional peripherals have a function of displaying a preview of image data that is the object of the output to be printed or sent.

Japanese Laid-Open Patent Publication No. 2005-73015 discloses a technique which determines whether image data displayed for previewing is a character image or a gradation image, and when it is a character image, displays the image by setting a preview magnification as to be enough to recognize the characters.

In addition, in recent years, an image forming apparatus that is a machine for copying only (that is, a copier) is getting multi-functions including a color copy, fax, filing, and a mail, and the function becomes more complicated. The more complicated the function becomes, the more possible that an operational error occurs. When the operational error is allowed, printing or sending is actually performed with the error, sheets are wasted and a security problem occurs. Of course, such an error may occur in a mono-functional copier and the like.

Such an operational error described above occurs because a user is not skilled in a method for using the image forming apparatus. Accordingly, in order to prevent the operational error, conventionally, as many as possible explanations have been described in an operational screen with a limited display area or otherwise training of the method for using has been performed for the user. In any method, to cause the user to get used in an actual apparatus, the operational error is allowed, printing sheets are wasted, and trouble that data with no security problem is sent may occur.

On the other hand, conventionally, image forming apparatus have been provided with various function limits. Examples thereof include, (1) as a result of authentication, except for a registered user, use is not permitted, (2) an upper-limit of the number of copies or the like is set individually for each user, and the use beyond the limit is not permitted, (3) a use limit of a function, fax is not usable, for example, is set individually for each user.

These function limits and use limits are effective for excluding a user, however, it is not possible to cause a user who is not familiar to the method of using the apparatus to study and get used thereto.

In addition, there is a preview function as described in Japanese Laid-Open Patent Publication No. 2005-73015, however, when a preview display is performed for all image data that is an object of an output irrespective of level of skill of a user, it is troublesome for a skilled user, and on the other hand, when a preview display is not performed for all image data, there is more possibility that an unskilled user as described above outputs image data with an operational error remained.

SUMMARY OF THE INVENTION

An object of the present invention is to provide an image forming apparatus and a preview display method capable of causing a user to get used to an operation of an apparatus while preventing executing an unnecessary output by a preview display before outputting, and eliminating trouble of a preview display for a user skilled in the operation of the apparatus.

Another object of the present invention is to provide an image forming apparatus having a display portion, a preview image generating portion that generates a preview image of image data to be output, and a display control portion that displays the preview image generated by the preview image generating portion on the display portion, comprising: a setting storage portion that stores, for each user, setting information related to a preview display by the display control portion, wherein the setting information includes forcible execution information showing whether or not the preview image is forcibly displayed by the display control portion, and the display control portion performs display control based on the setting information stored in the setting storage portion.

Another object of the present invention is to provide the image forming apparatus which is configured so as to be capable of operating in each of a plurality of operation modes, wherein the forcible execution information is set for each of the operation modes.

Another object of the present invention is to provide the image forming apparatus, wherein when the forcible execution information shows that the preview image is forcibly displayed, the setting information includes a display magnification value in displaying the preview image by the display control portion.

Another object of the present invention is to provide the image forming apparatus which is configured to be capable of operating in each of a plurality of operation modes, wherein the forcible execution information and the display magnification value is set for each of the operation modes.

Another object of the present invention is to provide the image forming apparatus which is capable of printing on sheets, comprising: an upper-limit-number storage portion that stores, for each user, the upper-limit number of printed sheets every fixed period; and a count portion that counts the number of printed sheets for each user the every fixed period, wherein the setting storage portion sets the forcible execution information so that the preview image is forcibly shown to a user that causes the number of printed sheets counted by the count portion to exceed the upper-limit number stored in the upper-limit-number storage portion.

Another object of the present invention is to provide the image forming apparatus comprising: a measuring portion that measures elapsed time from date and time of first use for each user, wherein the setting storage portion sets the forcible execution information so that the preview image is not shown to a user that causes the elapsed time to be over a predetermined length.

Another object of the present invention is to provide the image forming apparatus comprising an operation portion that prompts a user to select whether or not the preview image of the image data to be output is displayed by the display control portion, wherein the display control portion, reads the setting information stored in the setting storage portion, and performs display control based on the setting information read only when the user selects no preview image displayed by the operation portion.

Another object of the present invention is to provide preview display method in an image forming apparatus, having a display portion, a preview image generating portion that generates a preview image of image data to be output, and a display control portion that displays the preview image generated by the preview image generating portion on the display portion, including: a step in which a setting storage portion stores, for each user, setting information that is related to a preview display by the display control portion and includes forcible execution information showing whether or not the preview image is forcibly displayed by the display control portion; and a step in which the display control portion performs display control based on the setting information stored in the setting storage portion.

BRIEF DESCRIPTION OF THE DRAWINGS

FIG. 8 is a diagram for showing an example of a GUI image displayed when a user-based preview setting is selected in the system setting screen of FIG. 4;

FIG. 9 is a diagram for showing an example of a preview setting table generated as a result that a preview setting is made for each user in the GUI image of FIG. 8;

FIG. 16 is a diagram for showing an example of a preview display screen in a FAX data send mode in the digital multi-functional peripheral explained FIGS. 2 and 3.

PREFERRED EMBODIMENTS OF THE INVENTION

Now, a preferred embodiment of the present invention will hereinafter be described with reference to the drawings. An embodiment in which an image forming apparatus according to the present invention is applied to a digital multi-functional peripheral having a print function, a copy function, and a facsimile sending and receiving function, etc., will hereinafter be described specifically with reference to the drawings showing the embodiment.

<Apparatus Configuration>

Figure 1:
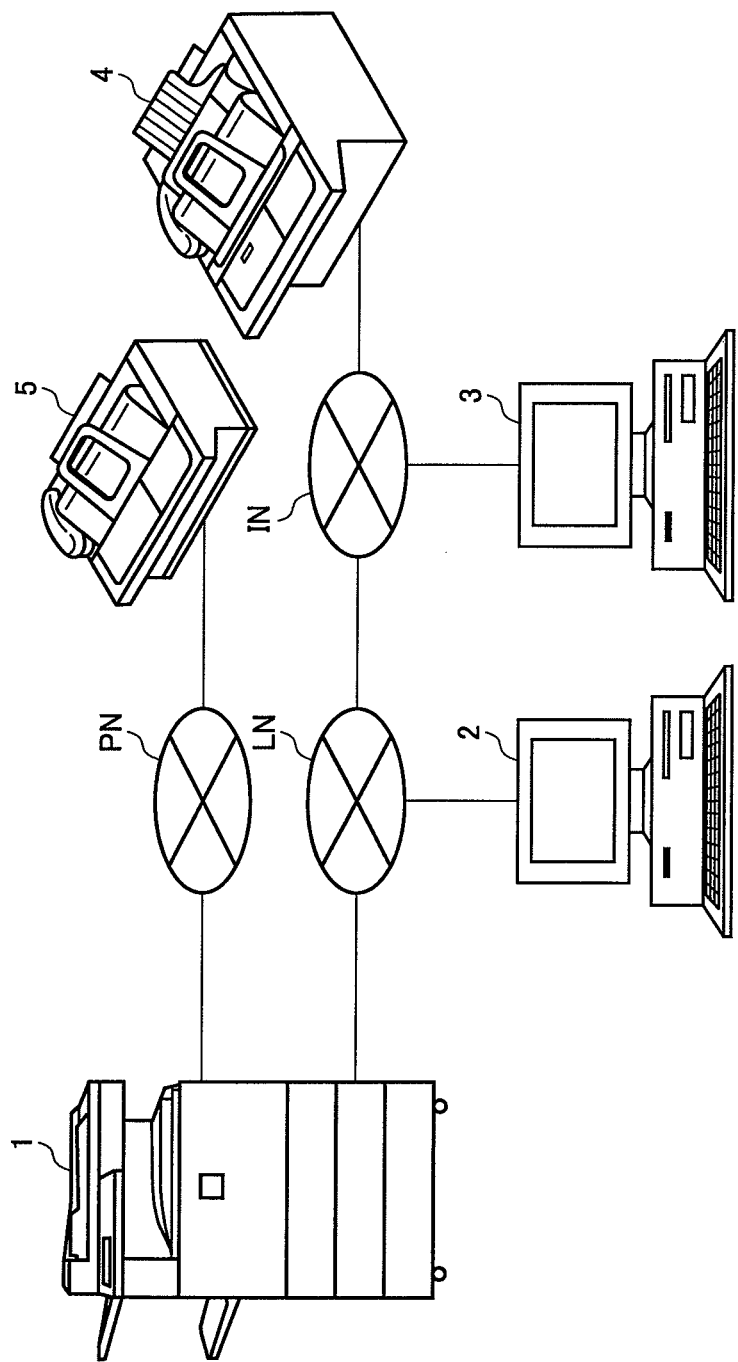
FIG. 1 is a schematic diagram for showing an exemplary configuration of an image processing system constructed by using a digital multi-functional peripheral as an example of an image forming apparatus according to an embodiment of the present invention.

FIG. 1 is a schematic diagram for showing an exemplary configuration of an image processing system constructed by using a digital multi-functional peripheral as an example of an image forming apparatus according to an embodiment of the present invention. In FIG. 1, 1 denotes a digital multi-functional peripheral, 2 and 3 denote external computers, denotes an internet facsimile apparatus (internet FAX apparatus), and 5 denotes a facsimile apparatus.

The digital multi-functional peripheral 1 has a function of sending and receiving image data by facsimile (facsimile function) and/or a function of sending and receiving image data by internet FAX (internet FAX function), as well as a print function and a copy function. This digital multi-functional peripheral 1 is connected to various external devices through a communication network. For example, an external computer 2 such as a personal computer (PC) is connected to a communication network LN that is laid as a local communication network, and an external computer 3 and an internet FAX apparatus 4 are connected to an internet network IN that is connected through a gateway not shown in the figure, or the like. Further, an external facsimile apparatus 5 is connected through a public switched telephone network PN. Note that, as described above, although description will be given only for the case where the image forming apparatus according to the present invention is applied to the digital multi-functional peripheral 1, the internet FAX apparatus 4 and the facsimile apparatus 5 are also applicable as the image forming apparatus according to the present invention.

Figure 2:
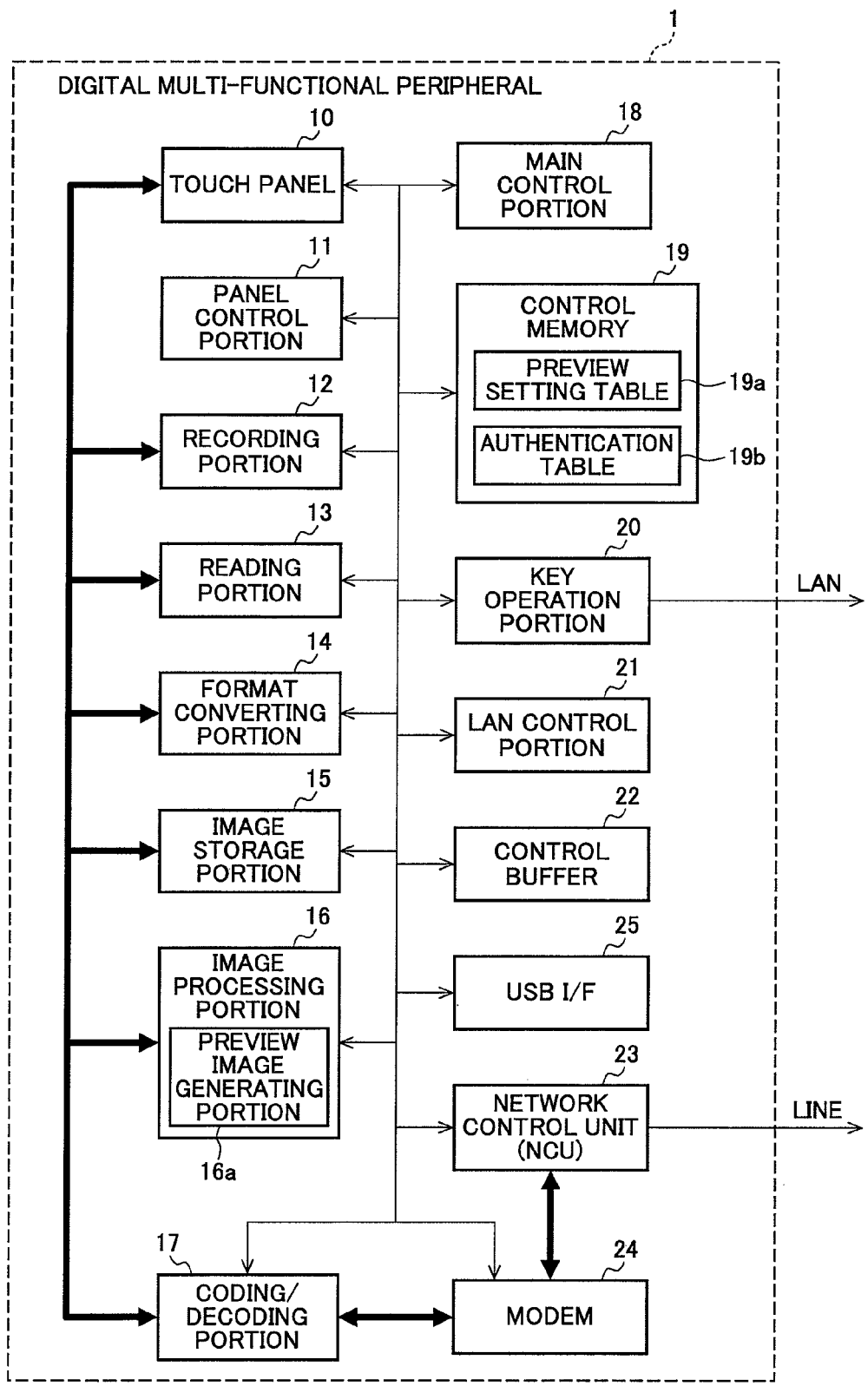
FIG. 2 is a schematic block diagram for showing an exemplary configuration of the digital multi-functional peripheral of FIG. 1.
Figure 3:
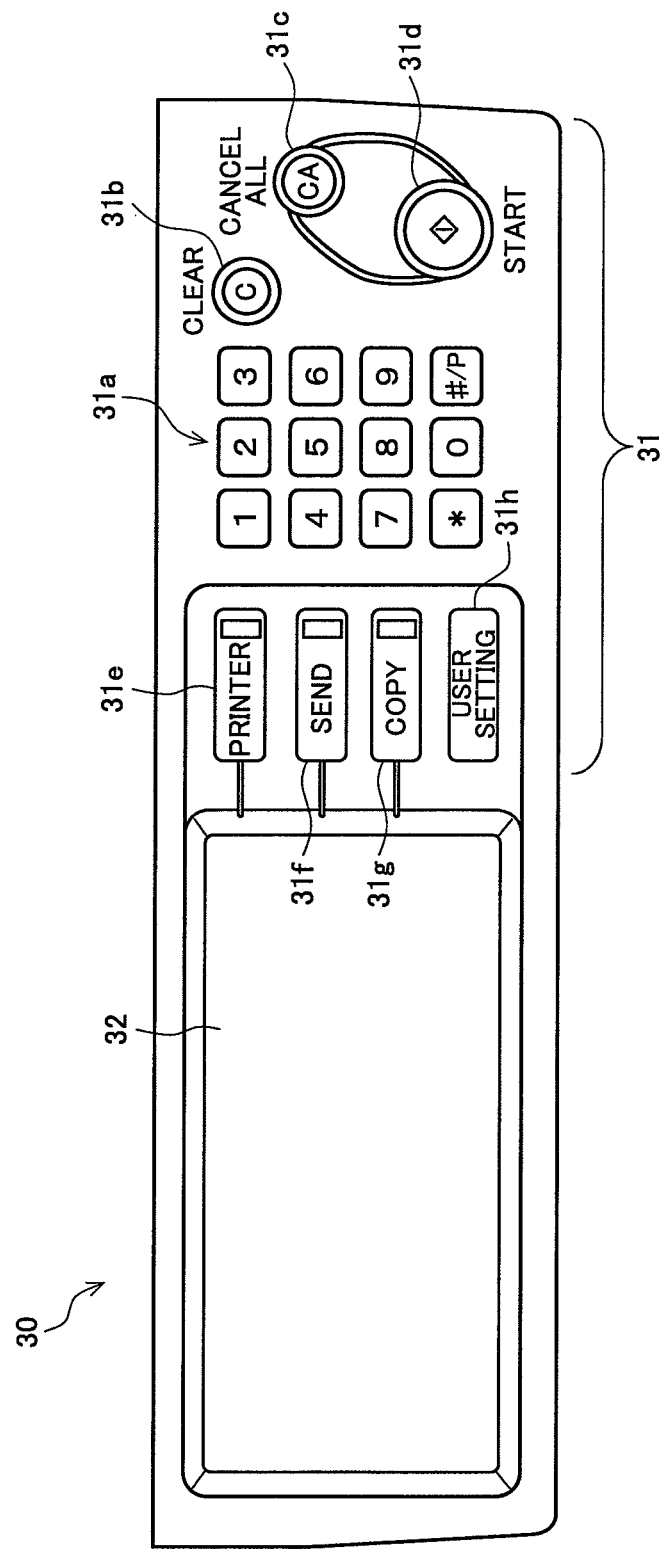
FIG. 3 is an external view for showing an example of a touch panel and a key operation portion in the digital multi-functional peripheral of FIG. 2.

Description will be given for a configuration and an operation of the digital multi-functional peripheral 1. FIG. 2 is a schematic block diagram for showing an exemplary configuration of the digital multi-functional peripheral of FIG. 1, and FIG. 3 is an external view for showing an example of a touch panel and a key operation portion of the digital multi-functional peripheral of FIG. 2.

The digital multi-functional peripheral 1 illustrated in FIG. 2 is provided with a touch panel 10, a panel control portion 11, a recording portion 12, a reading portion 13, a format converting portion 14, an image storage portion 15, an image processing portion 16, a coding/decoding portion 17, a main control portion 18, a control memory 19, a key operation portion 20, a LAN (Local Area Network) control portion 21, a control buffer 22, a network control unit (NCU) 23, a modem 24, and a USB (Universal Serial Bus) interface (I/F) 25. In addition, the digital multi-functional peripheral 1 may be provided with a post processing apparatus that performs the punching and the stapling, and description will hereinafter be given with reference to an embodiment provided with the post processing apparatus.

The main control portion 18 is comprised of a CPU (Central Processing Unit), a DSP (Digital Signal Processor), or the like. The control memory 19 is comprised of a nonvolatile memory or the like, such as a ROM (Read Only Memory) or an EEPROM (Electrically Erasable and Programmable ROM). A program (firmware) and various setting data are stored in the control memory 19 so as to be readable from the main control portion 18. Among them, at least the various setting data is stored in a rewritable memory. As a part of the setting data, a preview setting table 19a and an authentication table 19b which will be described below are stored so as to be rewritable in the control memory 19. The program and the various setting data may be stored in a hard disc as an exemplary configuration of the image storage portion 15, which will be described below. The control buffer 22 is comprised of a volatile memory such as a RAM (Random Access Memory).

The above-described program is for the main control portion 18 to issue a command related to generation and display of a preview image as will be described below according to the present invention, a command related to generation, sending, receiving and the like of a facsimile image, an electronic mail, and the like, a command related to original reading, a command related to printing, a command related to original reading and printing (that is, copying), and the like, to other parts. The program is downloaded by the main control portion 18 to the control buffer 22 and executed by referring to various setting data in the control memory 19 appropriately using the control buffer 22 as a data region for temporary storage (work).

The reading portion 13 reads an original as a bitmap image of RGB (R: Red, G: Green, and B: Blue) with a predetermined resolution by a scanner using a CCD (Charge Coupled Device) and outputs the read RGB image data (dot image data) to the image processing portion 16. The image processing portion 16 is comprised of an ASIC (Application Specific Integrated Circuit) or the like, and applies every kind of image processing to target image data. An example of the image processing will be described below. The ASIC may be incorporated with other parts such as the coding/decoding portion 17.

The image storage portion 15 is comprised of hard disc or the like, and stores image data that has been read by the reading portion 13 and has passed through the image processing portion 16, image data that has been received from outside through the LAN control portion 21, the NCU 23, etc., and the like. When image data is stored in the image storage portion 15, data that has been coded by the coding/decoding portion 17 may be also stored. Moreover, the image storage portion 15 may temporarily save intermediate data generated during image processing at the image processing portion 16.

The coding/decoding portion 17 compresses image data by coding and decodes (expands) the coded image data to original image data. For example, the coding/decoding portion 17 performs coding of image data read from an original, decoding of the coded data, decoding of coded image data received from outside, and the like. In the coding/decoding portion 17, coding systems corresponding to purposes are usable, including JPEG (Joint Photographic Experts Group) that is generally used in filing, and MH (Modified Huffman), MR (Modified READ) and MMR (Modified Modified READ) that are generally used in facsimile communication. As the coding system, MH is employable in IP facsimile communication, and JPEG and JBIG (Joint Bi-level Image Experts Group) as well as MH, MR, and MMR are employable in internet facsimile communication.

The format converting portion 14 converts read image data or image data received from outside into a predetermined file format such as a PDF (Portable Document Format), a GIF (Graphics Interchange Format), or a TIFF (Tag Image File Format).

The recording portion 12 is provided with a printer apparatus that employs a printing system such as an electrophotographic system or an inkjet system, and records (that is, prints) image data and the like stored in the image storage portion 15 on recording paper. The USB I/F 25 is an I/F for connecting to a USB device such as a USB memory, and outputs image data and the like after original reading that is stored in the image storage portion 15 to the USB device or reads a file from the USB device.

The modem 24 is comprised of a facsimile modem capable of facsimile communication, and is connected to a telephone line and is directly connected to the NCU 23. The NCU 23 is connected to the telephone line to control the line. That is, the NCU 23 is a hardware that performs an operation of closing and opening the line with an analogue public switched telephone network (PSTN), and connects the modem 24 to the public switched telephone network as the occasion demands. Such a configuration enables to send image data stored in the image storage portion 15 to outside by facsimile, to receive facsimile image data from the telephone line to store in the image storage portion 15, or to print by the recording portion 12 directly.

The LAN control portion 21 is connected to a LAN and performs communication of electronic mail data and communication of internet FAX via an internet. The internet FAX uses a LAN interface or the like to send and receive an electronic mail through a computer network such as a LAN.

The touch panel 10 or the key operation portion 20 receives an operation for selecting desired processing out of processing of reading an original, processing of sending and printing image data, etc., an operation for staring the processing, an operation for performing a setting that is necessary when each processing is executed (a selecting operation or an inputting operation), and the like. Various examples of the setting include a setting of the number of printed sheets in printing, a setting of punching and stapling and a setting of destination information in sending a facsimile image or an electronic mail.

The key operation portion 20 is provided with a key group necessary for operations. The touch panel 10 has a display portion and an operation receiving portion such as a touch sensor. The touch panel 10 is subjected to display control and operation reception control by the panel control portion 11. That is, the panel control portion 11 performs the display control for the display portion and the operation reception control for the operation receiving portion in the touch panel 10.

On the display portion of the touch panel 10, a current operating state, setting information (for example, sending destination, etc.) and the like are displayed. The display is realized when the panel control portion 11 performs control to display a GUI (Graphical User Interface) image. The GUI enables to change the display and an operation received position depending on a user operation. Each GUI and an image thereof may be stored so as to be readable in an internal memory of the panel control portion 11 or the control memory 19. In addition, as the display portion, display devices in various display systems including liquid crystal displays and organic EL (Electroluminescence) displays are employable.

The user operation received on the touch panel 10 is interpreted by the panel control portion 11 and is transmitted as an operation signal to the main control portion 18. The user operation received by the key operation portion 20 is interpreted by the key operation portion 20 itself and transmitted as an operation signal to the main control portion 18. The main control portion 18 issues a command in accordance with the operation signal obtained in this manner to other parts to cause the other parts to execute processing in accordance with the user operation. Note that, although description has been given with reference to the touch panel 10 in which the display device and the operation portion are integrated, only the display apparatus may be simply provided instead of the touch panel 10 and, in that case, where the user operation is received only by the key operation portion 20.

The touch panel 10 and the key operation portion 20 may be configured as an operation panel 30 as illustrated in FIG. 3, and the operation panel 30 is comprised of a key operation portion 31 (corresponding to the key operation portion 20) provided with various hardware keys and a touch panel 32 (corresponding to the touch panel 10) comprised of a liquid crystal display and a touch sensor. The present invention will hereinafter be described in detail with the touch panel 32 and the key operation portion 31 applied in the configuration of FIG. 1 instead of the touch panel 10 and the key operation portion 20.

The key operation portion 31 is provided with, as hardware keys, function switch keys 31*e*, 31*f*, and 31*g* for switching a print function, a sending function and a copy function, and a system setting key 31*h* for receiving a setting by a user (mainly an administrator user) as well as a numeric keypad 31*a* for inputting numeric values, a clear key 31*b* for clearing input set values, a cancel all key 31*c* for canceling all of input various settings, and a start key 31*d* for receiving instructions of start of copying, start of sending, etc.

An exemplary operation in the digital multi-functional peripheral 1 having the above-described exemplary configuration will be described.

<Original Reading Operation>

An original reading operation is performed when image data of a read original is stored (filed) in the image storage portion 15, when image data of a read original is sent to outside, when image data of a read original is printed (that is, copied), and the like.

When a user operation to perform processing requiring original reading is received by the operation panel 30, the main control portion 18 gives an instruction to the reading portion 13, the image storage portion 15, the image processing portion 16, the coding/decoding portion 17, and the like to execute processing as will be described below.

The reading portion 13 optically reads an image of an original placed on a document platen or an automatic document feeder and provides the image processing portion 16 with RGB image data (bitmap data of RGB) as a result of reading. The image processing portion 16 executes various image processing (hereinafter, referred to as original image processing) such as A/D conversion, shading correction, and γ correction for the RGB image data. Here, the shading processing is processing to remove various distortions generated in an illumination system, an image focusing system, and an image sensing system of the reading portion 13.

As the original image processing, original determination processing and segmentation processing may be executed subsequently to the A/D conversion, the shading correction, and the γ correction. The original determination processing includes processing of determining a type of the original and processing of determining whether the original is a color original or a monochromatic original based on input image data (image data after the application of the γ correction in this case). Examples of the type of the original include a text original, a printed photograph original, and text and printed photograph original in combination thereof. The image processing portion 16 outputs a determination signal (hereinafter, referred to as original determination data) as a result of the original type determination processing and the monochromatic/color original determination processing. The segmentation processing is processing of determining to what kind of area each pixel of the input image data (image data after the application of the γ correction in this case) belongs, and an example thereof includes processing of determining to which area including a black text area, a color text area and a halftone area each pixel belongs. The image processing portion 16 outputs segmentation data as a result of the determination. Note that, the segmentation processing may be executed based on the result of the above-described original determination processing and monochromatic/color original determination processing.

The original determination data and the segmentation data are stored in the image storage portion 15 in association with corresponding image data (image data after the application of the original image processing). At this time, the original determination data and the segmentation data are coded by the coding/decoding portion 17 and each coded data is thereafter stored in the image storage portion 15 in association with the corresponding image data. Note that, although the coding in storing in the image storage portion 15 is not essential, description will be given assuming that the image data is stored in a state of being coded. This is also the same in operations other than the original reading operation.

<Printing Operation>

By the above-described original reading operation, processing up to filing of the image data of the read original is completed. Next, description will be given for a printing operation when the image data of the read original is printed (that is, when the original is copied). When the user operation to perform processing that requires printing is received by the operation panel 30, the main control portion 18 gives an instruction to the recording portion 12, the image storage portion 15, the image processing portion 16, the coding/decoding portion 17, and the like to execute processing as will be described below. Note that, the main control portion 18 also gives an instruction to the reading portion 13 (original reading instruction), for example, when a copy operation is performed.

The digital multi-functional peripheral 1 is also capable of adding additional information such as a fixed stamp, date (or date and time), and a page number to image data in printing, and when such an adding instruction is given, the main control portion 18 controls the image processing portion 16. It can be said that the additional information added to the image data is an additional image. The additional information is stored in the control memory 19 and is read out as the occasion demands. Of course, the additional information may be originally stored as data of the additional image. In addition, it is recommendable that a plurality of additional information may be stored in the control memory 19 and additional setting information may be stored in the control memory 19. The additional setting information includes at least information showing a position to add to the image data (hereinafter, referred to as an adding position), and when a plurality of additional information is stored, information that indicates any of which is to be selected is also included. Moreover, when an instruction to execute the punching or the stapling by the post processing apparatus is given, the main control portion 18 also controls the post processing apparatus.

The coding/decoding portion 17 reads and decodes image data to be printed and original determination data and segmentation data corresponding thereto from the image storage portion 15, and gives the decoded image data to the image processing portion 16. The image processing portion 16 executes various image processing (hereinafter, referred to as image processing for printing) for the decoded image data (RGB image data). As will be schematically described below, examples of the image processing for printing include image quality adjustment processing, two-color processing, color correction processing, black generation and under color removal processing, spatial filter processing, scaling processing, output tone correction processing, and halftone generation processing. The black generation and under color removal processing, the spatial filter processing, and the halftone generation processing are processing in accordance with various areas indicated by the segmentation data.

As the image quality adjustment processing, a background is detected from the decoded image data to perform background removal. Moreover, as the image quality adjustment processing, RGB adjustment (color adjustment; entire color adjustment of redness or blueness), brightness adjustment, and vividness adjustment are also performed for the image data after the application of the background removal based on setting information set by a user from the operation panel 30. At this time, adjustment in accordance with an original type indicated by the original determination data may be performed.

As the color correction processing, CMY data having components of CMY (C: Cyan, M: Magenta, Y: Yellow) which are complementary colors of RGB is generated from the RGB data after the application of the image quality adjustment processing and the processing of enhancing color reproduction is performed. As the black generation and under color removal processing, black generation processing of generating black (K) data from the CMY data after the application of the color correction and under color removal processing of subtracting the K data obtained by the black generation from the original CMY data to generate new CMY data. As the spatial filter processing, enhancement processing or smoothing processing is performed for CMYK data which is data of the four colors. When a two-color mode for outputting the image data in two colors (for example, red and black) is selected, the two-color processing is performed. As the two-color processing, processing of converting the RGB data into CMY data that represents specified two colors (red and black in this case) is performed. In the case of the two-color mode, the black generation and under color removal processing is executed for the CMY data after the application of the two-color processing and the spatial filter processing is also executed, however, the color correction processing is not performed.

As the scaling processing, image enlarging processing or image reducing processing is performed for the CMYK data after the application of the spatial filter processing based on a printing copy ratio set by the user operation from the operation panel 30. The printing copy ratio is a copy ratio of a printed image for the image indicated by read and stored image data. Of course, the printing copy ratio is not limited to a copy ratio obtained by the user operation and is a copy ratio set as default when no operation is performed for the printing copy ratio. As the output tone correction processing, output γ correction processing of outputting to a recording medium such as recording paper is performed for the CMYK data. As the halftone generation processing, tone reproduction processing of outputting an image by error diffusion processing and dither processing is performed for the CMYK data after the application of the output tone correction processing. In the output tone correction processing and the halftone generation processing, the processing in accordance with an original type indicated by the original determination data may be performed, for example, including differentiating processing contents between a text area and other areas.

The CMYK data after the application of the halftone generation processing is provided to the recording portion 12. Description will be given for the case where additional information is added. There are a method for applying the scaling processing also to the additional information in accordance with a magnification of print data and a method for not applying the scaling processing to the additional information regardless of a magnification of print data. First, when the scaling processing is also performed for the additional information, the main control portion 18 reads the additional information and information showing an adding position, the main control portion 18 or the image processing portion 16 converts into image data as the occasion demands, and the image data of the additional information is provided to the image processing portion 16 before the scaling processing. Note that, the conversion is not necessary when additional image data is originally stored. Subsequently, the image processing portion 16 may synthesize the image data of the additional information and image data of an addition destination that is image data before the scaling processing at the above-described adding position.

When the scaling processing is not performed for the additional information, the main control portion 18 reads the additional information and information showing an adding position, and the main control portion 18 or the image processing portion 16 converts into image data as the occasion demands. In this example, CMYK data is obtained by the conversion. Note that, the conversion is not necessary when additional image data is originally stored. Subsequently, the image processing portion 16 may synthesize the image data of the additional information and image data of an addition destination that is image data after the application of the scaling processing (the above-described CMYK data to which the output tone correction processing or the halftone generation processing is applied) at the above-described adding position.

In either case, it is possible to output CMYK data after the application of the halftone generation processing with the additional information added thereto by the image processing portion 16. Note that, in the digital multi-functional peripheral 1, additional information and an adding position thereof are able to be set by the user using the operation panel 30 while performing a preview display described below.

The recording portion 12 receives the image data to which the image processing for printing has been given by the image processing portion 16 in this manner (CMYK image data in this example) and generates a hard copy (prints out) by an electrophotographic system, an inkjet system, or the like. Then, the post processing apparatus executes the punching or the stapling for printed sheets as the occasion demands. Note that, the data targeted for the printing operation described here is not limited to the image data read by the reading portion 13, and, for example, image data (image file) that has been previously transferred from an external recording medium such as a USB memory, a PC connected through a network, or the like and stored in the image storage portion 15 is also applicable in the same manner. The printing operation for the image data that has been received by facsimile and stored in the image storage portion 15 will be described below.

<Preview Display Operation for Image Data to be Printed>

Next, description will be given for an operation of displaying a preview of image data stored in the image storage portion 15 as a result of original reading on the touch panel 32 before printing (preview display operation). The digital multi-functional peripheral 1 is configured so as to allow image data that is an object for printing to be displayed for previewing (thumbnail display). The preview display operation is basically performed when a user operation to perform a preview display is received by the operation panel 30. For example, at the time when copy conditions are set and a start key is depressed after a setting of performing a preview display, original reading is started, and after the reading, the preview image may be displayed on the touch panel 32. Alternatively, the operation is also performed by a forcible preview display control as will be described below that is a main characteristic of the present invention.

The main control portion 18 gives an instruction to the image storage portion 15, the image processing portion 16, the coding/decoding portion 17, the panel control portion 11, and the like to execute processing as will be described below. Note that, the main control portion 18 also gives an instruction to the reading portion 13 (original reading instruction), for example, when an operation of copying an original is performed.

The coding/decoding portion 17 reads and decodes image data to be displayed for previewing and original determination data and segmentation data corresponding thereto from the image storage portion 15, and gives the decoded data to the image processing portion 16. The image processing portion 16 executes various image processing (hereinafter, referred to as image processing for previewing) for the decoded image data (RGB image data). As will be schematically described below, examples of the image processing for previewing include image quality adjustment processing, two-color processing, color correction processing, spatial filter processing, scaling processing, and output tone correction processing. The spatial filter processing and the output tone correction processing are processing in accordance with various areas indicated by the segmentation data.

The image quality adjustment processing here is the same as the image quality adjustment processing in the image processing for printing. As the color correction processing, processing of converting the image data after the application of the image quality adjustment processing (RGB data) into R'G'B' data based on display characteristics of the touch panel 32. As the spatial filter processing, enhancement processing or smoothing processing is performed for the R'G'B' data.

As the scaling processing, image enlarging processing/image reducing processing in accordance with a print magnification is performed for R'G'B' data after the application of the spatial filter processing, and further processing for converting the number of pixels of the R'G'B' data into the number of pixels (display resolution) of the touch panel 32 is performed and the image enlarging processing or image reducing processing is performed based on a preview display magnification at the same time. Note that, the preview display magnification is a magnification, for example, such as twice or four times, and is a magnification of an image in the preview display.

A preview image generating portion 16a provided in the image processing portion 16 generates an image for the preview display (preview image) mainly by such scaling processing for the preview display.

Description will be given for a preview image when additional information is added. As described above, the digital multi-functional peripheral 1 is capable of outputting image data to be output with additional information added thereto, and the preview display is executed when the panel control portion 11 performs control to display an image showing the additional information. Thus, the preview image generating portion 16a generates such an image showing the additional information and synthesizes it and the preview image generated from the image data to be output to generate a preview image with the additional information. The panel control portion 11 causes the touch panel 32 to display the preview image.

The additional information is able to be output with image data to be printed by performing the scaling processing in accordance with a print magnification, or is also able to be output in a state of being added to image data to be printed, to which the scaling processing in accordance with a print magnification has been given. First, when the scaling processing is also performed for the additional information to output, the main control portion 18 reads the additional information and an adding position thereof and provides to the image processing portion 16 before the scaling processing. Subsequently, the preview image generating portion 16a generates R'G'B' data of an image showing the additional information to synthesize with image data of an addition destination that is image data before the scaling processing at the above-described adding position. Then, the image enlarging processing/image reducing processing in accordance with a print magnification may be applied to the R'G'B' data to which the image of the additional information has been added.

When the scaling processing is not performed for the additional information, the main control portion 18 reads the additional information and an adding position thereof and provides to the image processing portion 16. Subsequently, the preview image generating portion 16a generates R'G'B' data of an image showing the additional information from the additional information to synthesize with R'G'B' data after the application of the image enlarging processing/image reducing processing in accordance with a print magnification at the above-described adding position, and performs processing for converting the number of pixels of the R"G"B" data after the addition into the number of pixels (display resolution) of the touch panel 32 and the image enlarging processing or image reducing processing based on a preview display magnification at the same time.

Moreover, when the punching or the stapling is applied by the post processing apparatus, image data for post processing such as punch or staple may be output by synthesizing it and a preview image generated from image data to be printed (and data of the image showing the additional information) at a punching position or a stapling position. Alternatively, separately from a preview image generated from image data to be printed (and data of the image showing the additional information), image data for post processing such as punch or staple may be output to be aligned in adjacent thereto. In the latter case, since the synthesizing processing is not required, the processing time becomes shorter. Either method is capable of displaying a finish state of paper on which an image is to be formed in the preview display of image data.

As the output tone correction processing, output γ correction processing for displaying image data on the touch panel 32 is performed for the R"G'B' data of the preview image or the preview image and the R'G'B' data of the image for post processing. In the output tone correction processing, processing in accordance with an original type indicated by the original determination data may be performed, for example, including differentiating processing contents between a text area and other areas.

The two-color processing is executed only when a two-color mode for outputting image data in two colors of red and black, for example, is selected. As the two-color processing, processing of converting the RGB data after the application of the image quality adjustment processing into CMY data that represents specified two colors (red and black in this case) is performed. The generated CMYK data is converted into R' G' B' data based on display characteristics of the touch panel 32 at the subsequent color correction processing.

R'G'B' data generated by the preview image generating portion 16a and dealt with by means of the output tone correction processing is given to the touch panel 32. The panel control portion 11 performs control for the touch panel 32 to display an image corresponding to the R'G'B' data in a state of being incorporated in a GUI image and displays the GUI image on the touch panel 32. The user confirms the image displayed for previewing that includes an image showing additional information, and determines whether to execute printing as it is or to cancel, whether to delete the additional information, and whether to execute changing of the adding position (or changing of the additional information), and is able to perform an operation corresponding thereto.

<Supplementary on Original Reading/Preview Display/Printing>

Although the preview display operation is explained separately from the printing operation, first, image data after the application of the output tone correction processing (CMYK data) as the printing operation may be converted into R'G'B' data based on display characteristics of the touch panel 32, and may be displayed on the touch panel 32 in a state of being incorporated in the GUI image after performing the conversion processing corresponding to the pixel number (display resolution) of the touch panel 32 and the scaling processing in displaying a preview. It is useful for a case where a setting is made such that the preview display is previously performed when the copying operation is performed since the printing operation is completed to a certain degree and the printing operation after the preview display can thereby be quickly completed, for example.

In addition, an example in which the coded image data, the original classification data and the segmentation data are stored in the image storage portion 15 in association with one another has been taken as the original reading operation, and the printing operation and the preview display operation have been also described based on the example. As an alternative method thereof, coding may be performed only for the image data read by the reading portion 13, and the coded image data may be temporarily stored in the image storage portion 15. In this case, it may be configured such that the image processing portion 16 applies the original type determination processing and the segmentation processing to the image data that has been read from the image storage portion 15 and decoded by the coding/decoding portion 17 in the printing operation and the preview display operation. In addition, such an alternative method is also applicable in sending image data such as facsimile sending or internet FAX sending, which will be described below.

<Supplement for Filing Operation>

As described as the original reading operation, the filing operation is an operation of storing read image data (which is coded as the occasion demands) in the image storage portion 15 provided inside the digital multi-functional peripheral 1. In filing, it is also possible to store (file) image data to be stored after adding additional information thereto. The preview display operation for the image data to be filed in the image storage portion 15 is basically as described in the image data to be printed.

<Printing Operation for Image Data Received by Facsimile>

Next, description will be given for the printing operation for image data received by facsimile communication. When detecting a facsimile communication request by the modem 24, the main control portion 18 gives an instruction to the recording portion 12, the image storage portion 15, the image processing portion 16, the NCU 23, the modem 24, and the like to execute processing as will be described below.

First, the modem 24 and the NCU 23 sequentially receive image data (compressed image data) sent from a sending source according to the communication procedure and expand the received compressed image data, and execute rotating processing (processing of rotating a sending direction), resolution conversion processing, and the like as necessary to provide to the image processing portion 16 at the same time.

Since the image data received by facsimile communication is black-and-white binary data, particular processing is not performed for the image data (K data) to which processing such as expansion has been given in the image processing portion 16, and the image data is directly given to the recording portion 12. The recording portion 12 receives the image data and executes printing by an electrophotographic system, an inkjet system, or the like. It is also possible to perform printing for the image data received by facsimile communication after adding the above-described additional information thereto.

Description has been given for the facsimile reception of the monochromatic image, but when a color facsimile image (RGB data) is received, the image processing portion 16 may execute the image processing for facsimile reception described here for the RGB data.

<Preview Display Operation of Image Data Received by Facsimile>

Description will be given briefly for the preview display operation of image data received by facsimile communication based on the printing operation of the same image data. The preview display operation is performed when a previous setting or a user operation is made such that printing is executed after the received image data is previously confirmed. In the preview display operation, the image processing portion 16 combines, in the case of adding additional information, image data of the additional information with image data after the application of the expansion processing or the like, and then, further performs the conversion processing in accordance with a pixel number (display resolution) of the touch panel 32, and the scaling processing in displaying a preview. The image data after the application of the scaling processing is displayed on the touch panel 32 in a state of being incorporated in the GUI image. The user confirms the image displayed for previewing, determines whether to execute or discard printing, and is able to perform printing or discarding operation.

<Facsimile Sending Operation>

Next, description will be given for a sending operation when image data of a read original is sent by facsimile. The facsimile image data is sent to destination (sending destination) information set by the user operation from the touch panel 32 or the key operation portion 31. The destination information (telephone number in this example) is stored in the control memory 19 and is read out as necessary. The destination information is generally stored as address book data so that information of each of a plurality of destinations is viewable and selectable, or is directly input before sending.

When the user operation to execute the facsimile sending is received by the operation panel 30, the main control portion 18 gives an instruction to the image storage portion 15, the image processing portion 16, the coding/decoding portion 17, the NCU 23, the modem 24, and the like to execute processing as will be described below. Note that, the main control portion 18 also gives an instruction to the reading portion 13 (original reading instruction), for example, when the operation to send the original by facsimile is performed. Note that, it is also possible for the main control portion 18 to select image data to be sent and start to send it by facsimile as it displays a preview of the image data stored in the image storage portion 15.

The coding/decoding portion 17 reads and decodes image data to be printed and original determination data and segmentation data corresponding thereto from the image storage portion 15 and gives the coded data to the image processing portion 16. The image processing portion 16 executes various image processing (hereinafter, referred to as image processing for facsimile sending) for the decoded image data (RGB image data). As will be schematically described below, examples of the image processing for facsimile sending include image quality adjustment processing, spatial filter processing, scaling processing, output tone correction processing, and halftone generation processing. The spatial filter processing and the halftone generation processing may be processing in accordance with various areas indicated by the segmentation data, while it is possible not to use the segmentation data. Further, in the original reading operation following the facsimile sending, the segmentation processing for the read image data and coding and storage of the segmentation data may not be executed.

As the image quality adjustment processing, the decoded image data is converted into K data using a matrix coefficient. In this case, a matrix coefficient in accordance with an original type indicated by the original determination data may be used. As the spatial filter processing, enhancement processing or smoothing processing is performed for the K data. As the scaling processing, image enlarging processing or image reducing processing in accordance with a sending resolution set by the operation panel 30 or a default-set sending resolution is performed for the K data after the application of the spatial filter processing. As the output tone correction processing, output $\gamma$ correction processing for the purpose of outputting to a recording medium such as recording paper at a sending destination, for example, is performed to the K data after the application of the scaling processing. Actually, it is possible to perform output $\gamma$ correction to a general device but not output $\gamma$ correction that takes a device of the sending destination into consideration. As the halftone generation processing, binarization by error diffusion processing, for example, is performed for the K data after the application of the output tone correction processing. In the output tone correction processing and the halftone generation processing, processing in accordance with an original type indicated by the original determination data may be performed.

Description has been given for the facsimile sending of the monochromatic image, but when a color image is sent by facsimile, the image processing portion 16 may perform processing of converting the decoded image data into L*a*b* data for color transmission using a matrix coefficient as the image quality adjustment processing in the above-described image processing for facsimile sending so that the subsequent processing is performed for the L*a*b* data.

The rotating processing is applied to the image data after the application of the halftone generation processing as the occasion demands and the image data after the application of the halftone generation processing is compressed and coded by the coding/decoding portion 17 in a compression format at the facsimile sending, and, then temporarily saved in the image storage portion 15. The modem 24 performs sending procedure to a sending destination set through the NCU 23, and at the time when communication with the sending destination is established (at the time ready for sending), the coded K data which is temporarily saved is read out and sequentially sent to the sending destination through the public line network after the application of necessary processing such as changing of the compression format.

In addition, the digital multi-functional peripheral 1 is also capable of sending image data to be sent with additional information added thereto. When sending image data to the outside like in this example, it is also possible to add sending source information (transmission source information) in addition to a stamp, date (date and time), and a page number as the additional information. In this case, the sending source information that is added in sending image data may include any one or more pieces of information of a name of a sender, information of a telephone number of a sending source, and information of an electronic mail address of a sending source. Moreover, information of a sending destination (information of a destination) and the like may be added as the additional information in sending image data.

In the case of the facsimile sending with additional information added, synthesizing processing may be performed as follows. The main control portion 18 reads additional information and information showing an adding position, the main control portion 18 or the image processing portion 16 converts the information into image data, and the image processing portion 16 synthesizes the converted image data (image data of additional information) and image data of an addition destination that is image data after the application of the scaling processing at the above-described adding position. In the digital multi-functional peripheral 1, the position at which the image data of the additional information is added is possibly set by a user from the operation panel 30 as the user performs the preview display as will be described below. The synthesized image data is sent to the sending destination after the above-described output tone correction processing, rotating processing, and compression processing, etc., are applied to it.

<Preview Display Operation for Image Data to be Sent by Facsimile>

The digital multi-functional peripheral 1 is configured so as to be possible to display image data to be sent by facsimile sending or the like for previewing. The preview display operation is performed, for example, when the previous setting or the user operation to execute sending after the confirmation of the image data before sending in advance is performed. Description will be given for the preview display operation for the image data to be sent by facsimile based on the facsimile sending operation for the same image data. In the preview display operation, the main control portion 18 also gives an instruction to the panel control portion 11.

In the preview display operation, the image processing portion 16 performs the same processing as in the facsimile sending up to the image quality adjustment processing, the spatial filtering processing (and scaling processing), executes preview image generation processing by the preview image generating portion 16a and may perform, the output $\gamma$ correction processing to display image data as the output tone correction processing. As the preview image generation processing, the preview image generating portion 16a generates the data of the preview image by performing the conversion processing in accordance with a pixel number (display resolution) of the touch panel 32 and the scaling processing in accordance with a reducing/enlarging ratio in displaying a preview (preview display magnification) to the image data after the application of the image enlarging processing/image reducing processing in accordance with a sending resolution. Note that, in the preview display operation, the spatial filter processing may not be executed and the halftone generation processing is not executed.

R'G'B' data generated by the preview image generating portion 16a and dealt with by means of the output tone correction processing is given to the touch panel 32. The panel control portion 11 performs control for the touch panel 32 to display an image corresponding to the R'G'B' data in a state of being incorporated in a GUI image and displays the GUI image on the touch panel 32.

Description will be given for a preview image that is sent with additional information added thereto. The additional information is output by being added to image data after the application of the scaling processing in accordance with a sending resolution. More specifically, the main control portion 18 reads the additional information and an adding position thereof and gives the information and the position to the image processing portion 16. Subsequently, the preview image generating portion 16a generates R'G'B' data of an image showing the additional information from the additional information and synthesizes it and R'G'B" data after the application of the image enlarging processing/image reducing processing in accordance with a sending resolution at the above-described adding position. Then, processing for converting the number of pixels of the R"G"B" data after the addition into the number of pixels (display resolution) of the touch panel 32 is performed and the image enlarging processing or image reducing processing is performed based on a preview display magnification at the same time.

The image data combined with the additional information image in this manner is incorporated in a GUI image and displayed on the touch panel 32 after the application of the output tone correction processing (output γ correction processing to display image data) in the above-described preview display. The user confirms the image displayed for previewing including the additional information image, determines whether to execute the facsimile sending as it is or to cancel, whether to delete the additional information, whether to execute changing of the adding position (or changing of the additional information), or the like, and is able to perform an operation corresponding thereto.

<Sending Operation for Image Data Via Internet>

Next, description will be given for a sending operation when image data of a read original is sent by an electronic mail or internet FAX via the internet. Such image data to be sent via the internet is also sent to sending destination information (electronic mail address in this example) set by the user operation from the touch panel 32 or the key operation portion 31 and stored in the control memory 19.

When the user operation concerning the sending via the internet is received by the operation panel 30, the main control portion 18 gives an instruction to the format converting portion 14, the image storage portion 15, the image processing portion 16, the coding/decoding portion 17, the LAN control portion 21, and the like to execute sending processing via the internet as will be described below. Note that, the main control portion 18 also gives an instruction to the reading portion 13 (original reading instruction), for example, when an operation to send an original via the internet is performed.

The coding/decoding portion 17 reads and decodes image data to be printed and original determination data and segmentation data corresponding thereto from the image storage portion 15, and gives the decoded data to the image processing portion 16. The image processing portion 16 executes various image processing (hereinafter, referred to as image processing for internet sending) to the decoded image data (RGB image data). Examples of the image processing for internet sending include the image quality adjustment processing, the spatial filter processing, the scaling processing, the output tone correction processing, and the halftone generation processing, which have been described in the image processing for facsimile sending.

Moreover, the image processing in the case of color image sending is also the same as the image processing for facsimile sending, and in the image processing for internet sending, the image processing portion 16 may perform processing of converting the decoded image data into L*a*b* data for color transmission using a matrix coefficient as the image quality adjustment processing so that the subsequent processing is performed for the L*a*b* data.

The coding/decoding portion 17 codes (compresses) the image data after the application of the image processing for internet sending to obtain compressed files. The compression is performed in the unit of a single page of the original. Subsequently, the format converting portion 14 converts the compressed files into a single file and the file is attached to a multipart mail according to MIME (Multipurpose Internet Mail Extension), for example. By the processing so far, the read image data is converted into a format of an electronic mail. The electronic mail is sent to a sending destination via the internet using a mail transfer protocol such as an SMTP (Simple Mail Transfer Protocol) through a LAN interface by the LAN control portion 21.

In the case of the internet facsimile sending, the coding/decoding portion 17 may perform the compression in a compression format only for facsimile such as MH, for example, and the format converting portion 14 may convert the obtained compressed files in the unit of a page, for example, into a single TIFF file. In the case of sending just by attaching to the electronic mail as an attached file (in the case of sending by so-called scan to e-mail), the coding/decoding portion 17 may perform the compression in a compression format such as JPEG, for example, and the format converting portion 14 may convert the obtained compressed files in the unit of a page into a single PDF file, for example.

In addition, even when image data to be sent is image data sent via the internet, the digital multi-functional peripheral is capable of sending the image data with additional information added thereto in the same manner as the case of the facsimile sending image data. As the additional information adding processing, the synthesizing processing described in the facsimile sending may be executed, and the image data is subjected to the output tone correction processing, the compression processing, the format conversion processing, and the like described above and thereafter sent to an address of a sending destination as an electronic mail.

<Preview Display Operation for Image Data to be Sent Via Internet>

As mentioned in the description for the preview display in the facsimile sending, the digital multi-functional peripheral 1 of the present invention is capable of being configured so that a preview of image data to be sent via the internet is also able to be displayed on the touch panel 32.

In the preview display operation, as mentioned in the description for the preview display in the facsimile sending, the image processing portion 16 performs the same processing as the image processing for the internet sending up to the image quality adjustment processing, the spatial filter processing (and the scaling processing), executes the preview image generation processing by the preview image generating portion 16a and may perform, as the output tone correction processing, the output γ correction processing to display image data. R'G'B' data generated by the preview image generating portion 16a and dealt with by means of the output tone correction processing is given to the touch panel 32, is incorporated by in a GUI image the panel control portion 11 and is displayed on the touch panel 32. Further, a preview display in which an image showing additional information is added is also possible to be described by using the description for the preview display in the facsimile sending.

<Description of Preview Display Before Outputting (Sending, Printing, or Filing) Image Data According to the Present Invention>

As has been described the preview display operation before printing in copying, in filing, or in sending data by facsimile or the like, the digital multi-functional peripheral 1 according to the present invention has the preview image generating portion 16a that reads image data that is the object of the output from the image storage portion 15 and generates a preview image thereof.

The image data to be output may be image data input from any of a scanner apparatus illustrated as the reading portion 13, an attachable/detachable storage apparatus illustrated as the USB memory connected to the USB I/F 25, and a communication line illustrated as the LAN or the line. The image data to be output may also be image data read from a storage apparatus illustrated as the image storage portion 15 provided in the digital multi-functional peripheral 1.

The preview image firstly generated by the preview image generating portion 16a to be firstly displayed, is an enlarged/reduced image based on a predetermined preview display magnification, and a reduced image is preferable. The preview image generated by the preview image generating portion 16a is sent to the touch panel 32 by the control of the main control portion 18, is controlled by the panel control portion 11 to be displayed in a state of being incorporated in a GUI image, and is displayed on the touch panel 32.

In this manner, the panel control portion 11 is an example of a display control portion for performing a control to display the generated preview image on the display portion, and the touch panel 32 is an example of the display portion for displaying a preview image of the image data that is the object of the output.

As has been described above, the digital multi-functional peripheral 1 is configured to be capable of outputting image data that is the object of the output with additional information added thereto. Furthermore, the panel control portion 11 performs control based on the control of the main control portion 18 to display an additional information image on the touch panel 32. Therefore, the preview image generating portion 16a generates such an additional information image like this and generates a preview image with the additional information added thereto by combining the image with the additional information with a preview image generated from image data that is the object of the output. Note that, in a preview display, description is given on the assumption that an image itself showing additional information is combined at an adding position and displayed, however, it may be configured such that an existence image showing that additional information exists is displayed instead of the additional information.

The panel control portion 11 performs control for the touch panel 32 to display the generated preview image in a state of being incorporated in a GUI image and displays the GUI image on the touch panel 32. In this way, the digital multi-functional peripheral 1 is preferably configured such that the display control portion performs control for the display portion to display additional information in displaying a preview. It is thereby possible to confirm a preview image that is closer to an output form.

The digital multi-functional peripheral 1 according to the present invention is, as a main characteristic, provided with a setting storage portion for storing setting information related to a preview display by the display control portion for each user. Here, the setting information is assumed to include forcible execution information showing whether or not a preview image is forcibly displayed by the display control portion. The setting storage portion can be illustrated as the control memory 19 of FIG. 2 and the setting information can be illustrated as the preview setting table 19a.

In the digital multi-functional peripheral 1 according to the present invention, as a main characteristic, the display control portion performs display control based on the setting information including the forcible execution information stored in the setting storage portion. The setting information is set for each user as described above, therefore, display control on the display control portion is different for each user. Especially, whether or not the forcible preview display is executed can be differentiated for each user. In addition, a setting of setting information is usually made by an administrator.

For specification of a user, a user specification portion is provided in the digital multi-functional peripheral 1 and a user may be specified. Then, the user specification portion gives the specified result to the display control portion and the display control portion may read setting information of the specified user. The user specification portion can be illustrated as an authentication table 19b within the control memory 19 of FIG. 2 and the main control portion 18 that refers to the authentication table 19b and executes authentication.

In the present invention, with a configuration described above, information (including forcible execution information) related to a preview display can be set for each user. For example, it is assumed that there is a high possibility of making an operational error for a total novice hardly knowing a method for using, and forcible execution information may be set such that a forcible preview display is performed. On the other hand, it is assumed that there is a low possibility for a user who is not a novice to make an operational error, and forcible execution information may be set such that a forcible preview display is not executed.

By such a setting, in the present invention, it is possible to cause a user to get used to an operation of the digital multi-functional peripheral 1 while preventing executing unnecessary output by a preview display before outputting, and to eliminate trouble of a preview display for a user skilled in an operation of an apparatus.

<Specific Example of Preview Display>

Referring to FIGS. 4 to 16, description will hereinafter be given specifically for an example of a system setting to enable a display of a preview image of image date that is the object of the output for each user, and an example of a preview display.

Figure 4:
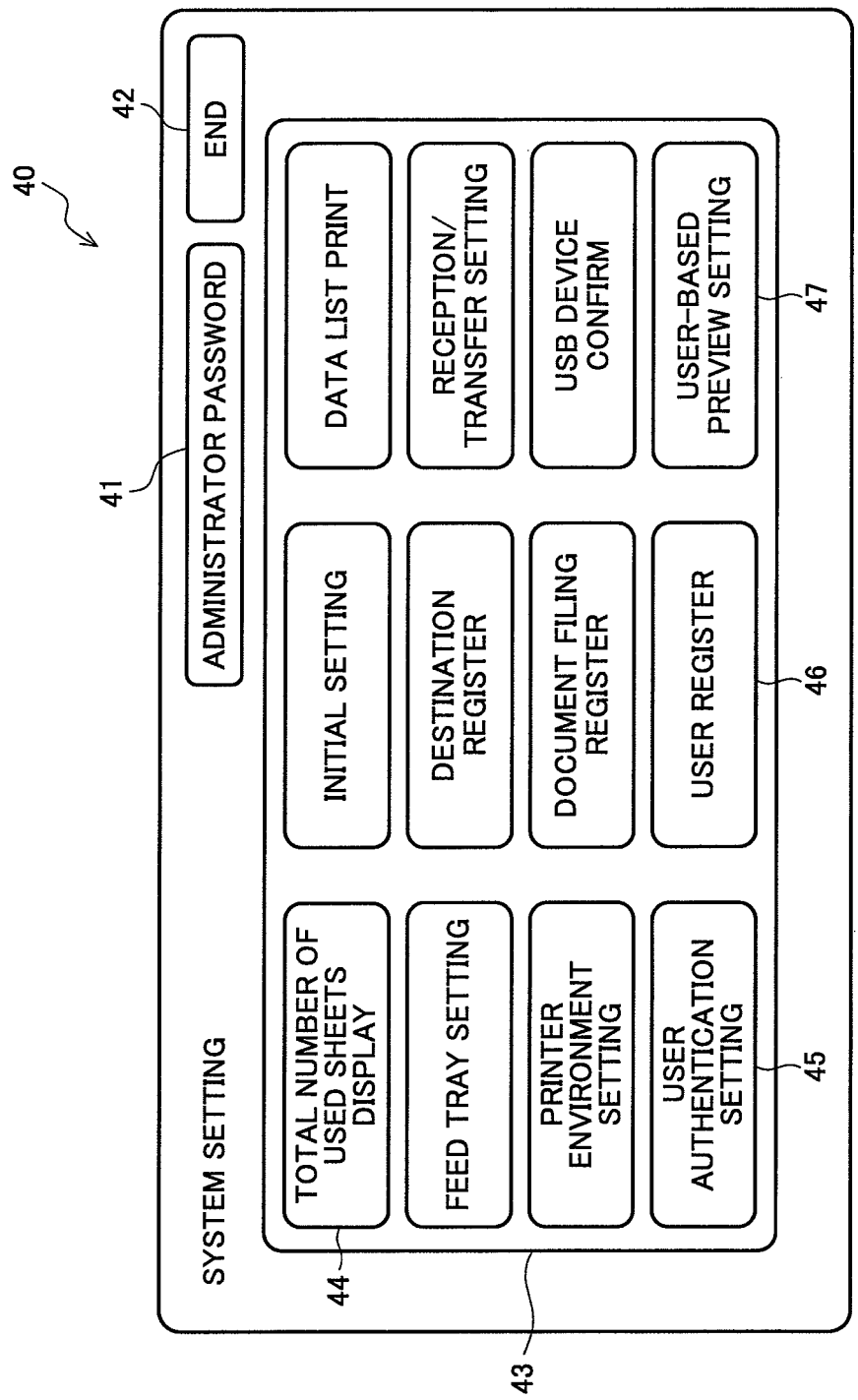
FIG. 4 is a diagram for showing an example of a system setting screen in the digital multi-functional peripheral explained in FIGS. 2 and 3.

First, description will be given for a system setting mainly performed by an administrator of the digital multi-functional peripheral 1 with reference to FIGS. 4 to 9. FIG. 4 is an example of a system setting screen in the digital multi-functional peripheral explained in FIGS. 2 and 3.

A GUI image 40 shown in FIG. 4 is displayed as a system setting screen on the touch panel 32 when a system setting key 31h in an operation panel 30 of FIG. 3 is depressed. In the GUI image 40, an administrator password key 41 and an end key 42 are also displayed so as to be selectable. By selecting the administrator password key 41 and inputting a correct password in the subsequent password input screen, each key in a setting column 43 is selectable. Description will hereinafter be given on the assumption that the correct password has been already input. In addition, the end key 42 is selected to return to a screen that has been originally displayed from the system setting screen.

In the setting column 43 of the GUI image 40, various setting keys such as a total number of used sheets display key 44 and the like are displayed so as to be selectable by a user. In the setting column 43, a user authentication setting key 45, a user registration key 46, and a user-based preview setting key 47 are also displayed so as to be selectable by a user.

Figure 5:
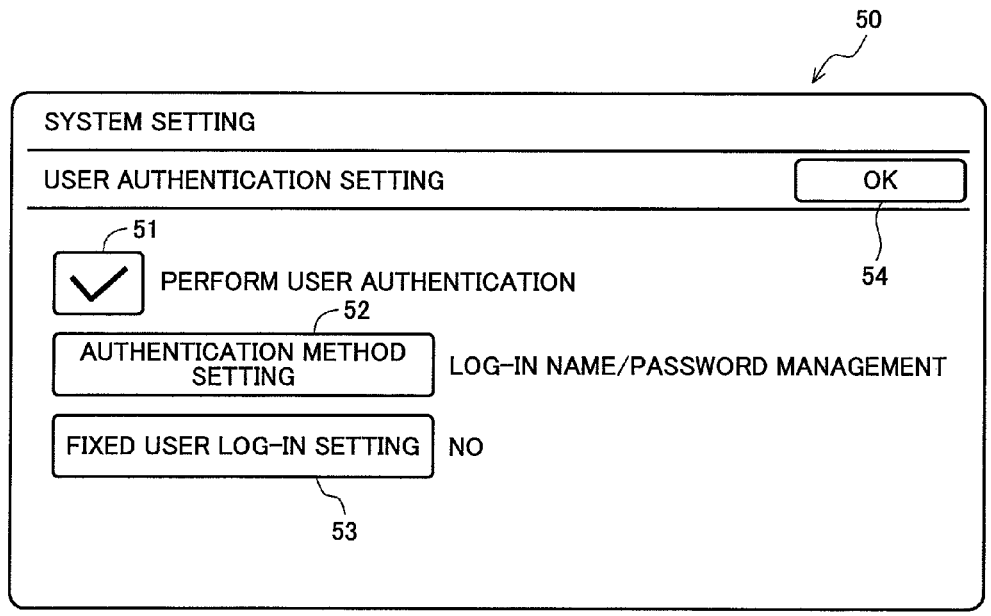
FIG. 5 is a diagram for showing an example of a GUI image displayed when a user authentication setting is selected in the system setting screen of FIG. 4.

When the user authentication setting key 45 is selected, a GUI image 50 shown in FIG. 5 is displayed on the touch panel 32. FIG. 5 is a diagram for showing an example of a GUI image displayed when a user authentication setting is selected in the system setting screen of FIG. 4. In the GUI image 50, a check key 51 of whether or not a user authentication is performed, a setting key 52 for proceeding to a setting screen for selecting an authentication method to be used from various authentication methods, and a setting key 53 for proceeding to a screen for making a setting of a log-in method of a fixed user are displayed.

Checking the check key 51 enables a user authentication. In the present invention, a user authentication result is used as an example of a user specification result, and a setting is made such that the user authentication is possible to set whether or not a forcible preview display is performed, etc.

Figure 6:
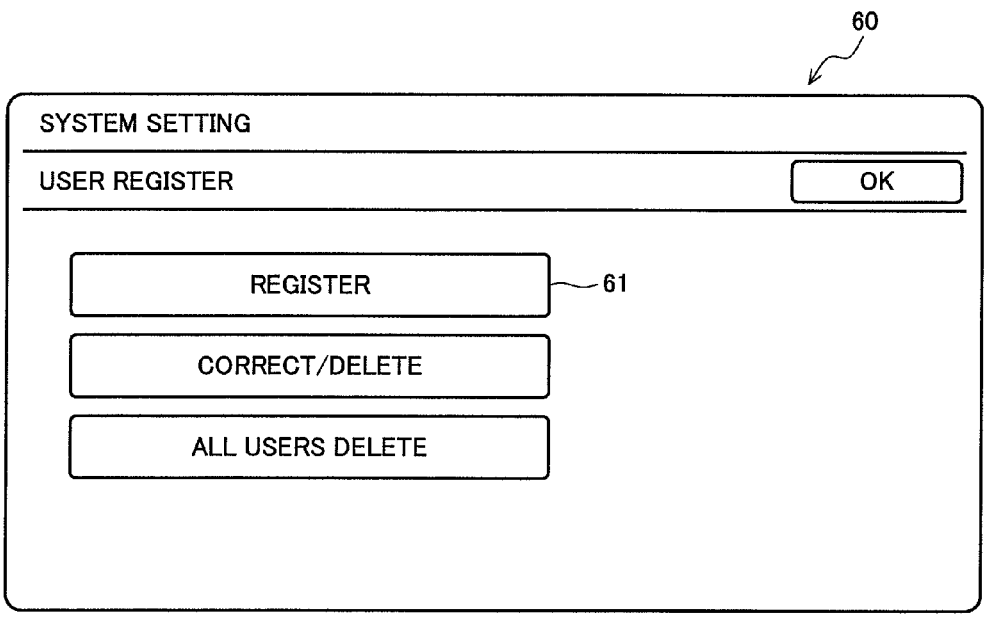
FIG. 6 is a diagram for showing an example of a GUI image displayed when user registration is selected in the system setting screen of FIG. 4.

When the user registration key 46 is selected in the GUI image 40, a GUI image 60 shown in FIG. 6 is displayed on the touch panel 32. FIG. 6 is a diagram for showing an example of a GUI image displayed when user registration is selected in the system setting screen of FIG. 4.

Figure 7:
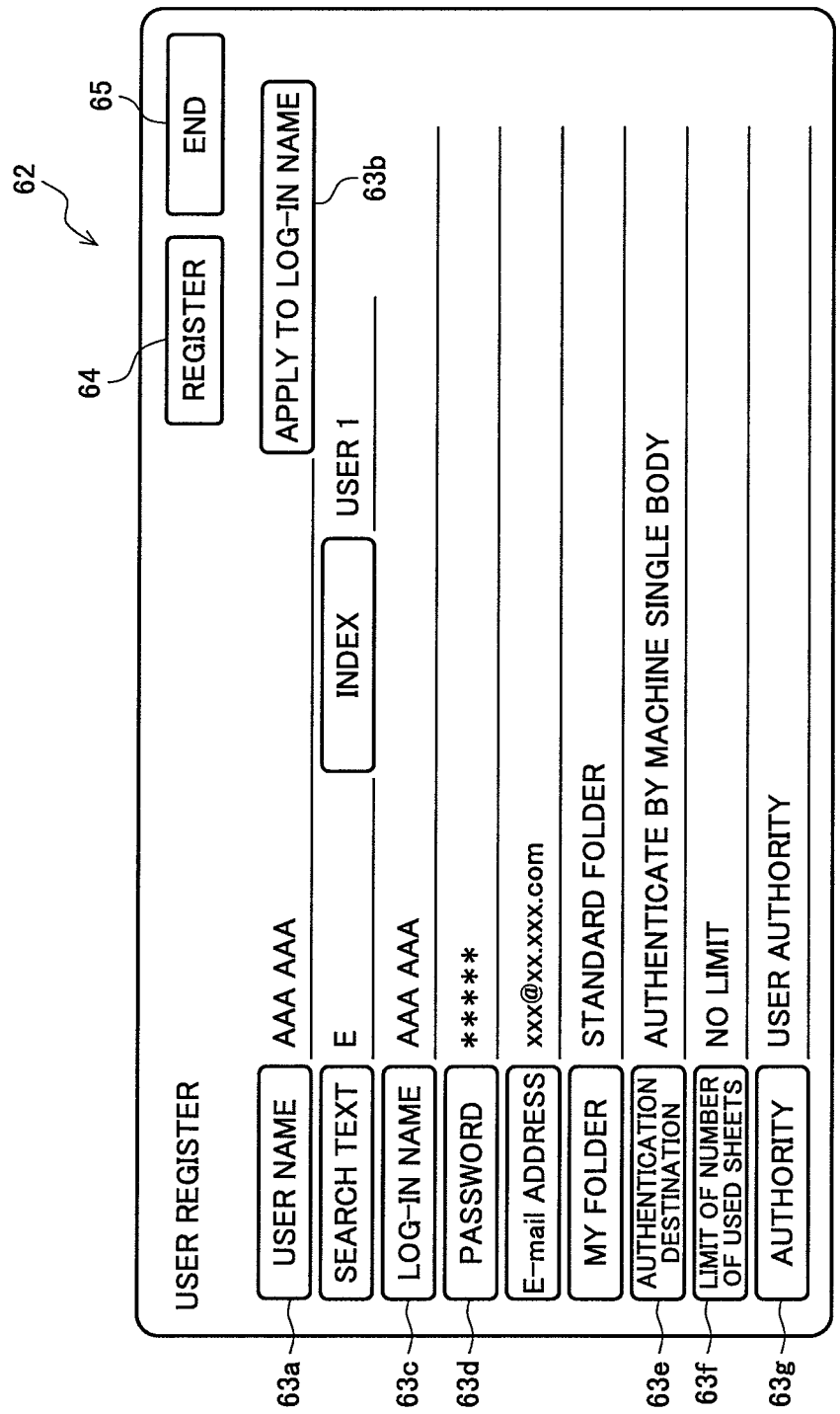
FIG. 7 is a diagram for showing an example of a GUI image displayed when registration is selected in the GUI image of FIG. 6.

In the GUI image 60, in addition to a registration key for proceeding to a user registration screen, a correct/delete key for proceeding to a screen for correcting/deleting registration information, an all user delete key for deleting registration information of all users. When the registration key 61 is selected in the GUI image 60, a GUI image 62 shown in FIG. 7 is displayed on the touch panel. FIG. 7 is a diagram for showing an example of a GUI image displayed when registration is selected in the GUI image of FIG. 6.

In the GUI image 62, in addition to a registration execution key 64 for executing registration with current contents and an end key 65 for ending user registration, various setting keys such as a user name setting key 63a, a key 63b for applying the user name to a log-in name, a log-in name setting key 63c, a password setting key 63d, an authentication destination setting key 63e, a number of used sheets limit setting key 63f, an authority setting key 63g, and the like are displayed so as to be selectable by a user.

When various setting keys are selected, a setting is possible for each setting screen. In addition, current setting contents are displayed next to various setting keys. An administrator sets registration contents of a user by various setting keys, and by selecting the registration execution key 64, a user registration of the user can be performed. Among them, at least a log-in name and a password is recorded in an authentication table of the control memory 19 to be referred at the time of log-in (time of authentication).

When the user-based preview setting key 47 is selected in the GUI image 40, a GUI image 66 shown in FIG. 8 is displayed on the touch panel 32. FIG. 8 is a diagram for showing an example of a GUI image displayed when a user-based preview setting is selected in the system setting screen of FIG. 4, and FIG. 9 is a diagram for showing an example of a preview setting table generated as a result that a preview setting is made for each user in the GUI image of FIG. 8. Note that, when a setting is not made such that a user authentication is performed in a user authentication setting, by displaying earlier an image prompting the setting, for example, an administrator may perform earlier an execution setting of the user authentication.

In the GUI image 66, together with notation prompting a preview setting for each user of "Select a function of previewing for each user", for example, it is possible to set setting information related to a preview display for each of functions of a copy function 69a, a fax function 69b, a filing function 69c, and a mail sending function 69d. Here, as illustrated as a group K, in the user registration, a plurality of users may be handled as a group of users and the same setting information may be applicable thereto.

Each of functions corresponds to an operation mode. Here, although it is omitted on the drawing, in a setting column of each setting information (for example, a setting column of a copy function for a user AAA AAA), "+" and "*" are selectable by a pull-down menu or the like. In this example, "+" corresponds to a setting for performing a forcible preview display by a standard magnification, and "*" corresponds to a setting for performing a forcible preview display by a magnification that is larger than the standard. "*" may be set when there is no problem by causing a user to confirm not a whole but only an important part, since a preview image is displayed after magnification. In addition, in this example, the case of not setting "+", "*", or any corresponds to a setting for not performing a forcible preview display.

As illustrated at two types of preview display magnification as "+" and "*", when showing that the forcible execution information forcibly displays a preview image, setting information preferably includes a display magnification value in displaying a preview image by the display control portion. Note that, only two types of magnification are illustrated here, it may be configured such that a magnification value is settable more in detail.

In addition, as illustrated as each of functions 69a to 69d, the forcible execution information (and display magnification value) is preferably set for each operation mode. Of course, it is assumed that the digital multi-functional peripheral 1 is configured to be capable of operating in each of a plurality of operation modes. Here, the operation modes include, a copy mode, an image send mode (FAX data send mode), a document filing mode, an electronic mail send mode, and the like, as illustrated as each of functions 69a to 69d. Note that, the operation mode is a mode determined mainly in accordance with an output form, however, may be handled as a mode determined in accordance with an input form, and may be handled as a mode determined as both output form and input form.

The end key 67 is a key for ending the setting, and the administrator performs a setting for each user and for each function, and thereafter selects the end key 67 to complete the setting. The set information is written or rewritten in the control memory 19 by the main control portion 18, like in the preview setting table 19a illustrated in FIG. 9. Note that, in the GUI image 66, a shift key 70 is a key for shifting to display a setting column of a user other than a user shown here, and in this example, users in other twenty-four pages are registered.

In examples shown in FIGS. 8 and 9, an administrator sets forcible execution information to perform a forcible preview display in copying, FAX/mail sending, and filing on the assumption that a user AAA AAA and a group K are total novices who hardly know a method of using and it is highly possible that an operational error is made. In addition, the administrator sets the forcible execution information such that attention is paid only to ones for going outside on the assumption that a user BBB BBB is a user who is slightly used to an apparatus and operational errors are few. In this way, although points that should be confirmed for each user are different, the forcible execution information and the display magnification value are settable not only for each user but also for each function (each operation mode) to enable a preview display specialized for all users in different points.

In this way, in the example, it is possible, for each user, to change a setting for presence/absence of a forcible preview, a display magnification at the time of the forcible preview, and a function for performing the forcible preview is performed. For an inexperienced user (for example, a user AAA AAA), a forcible preview display is executed for all functions to be used to eliminate an error to be able to reduce unnecessary copying and sending. For a user who is experienced to a certain extent (for example, a user BBB BBB), fax or mail sending to be sent outside is stilled paid attention. For a skilled user (for example, a user DDD DDD), a forcible preview is not executed for all functions to be able to eliminate trouble. In the example, a limit level can be changed for each user, and it is thereby possible to set a forcible preview display that suits a level of the user. In addition, since an administrator determines a level for each user to decide and set a level of the forcible preview display, administration is fully performed.

In addition, not limited to a setting method like in the GUI image 66 of FIG. 8, for example, when an administrator selects from items such as "an inexperienced user", "a user who is experienced to a certain extent", "a skilled user", or the like for each user, to correspond to each of the selected item, decision may be automatically made as all "+" for all functions, "+" for only FAX/mail function, or "no setting (that is, no forcible preview display)" for all functions, for example.

Figure 10:
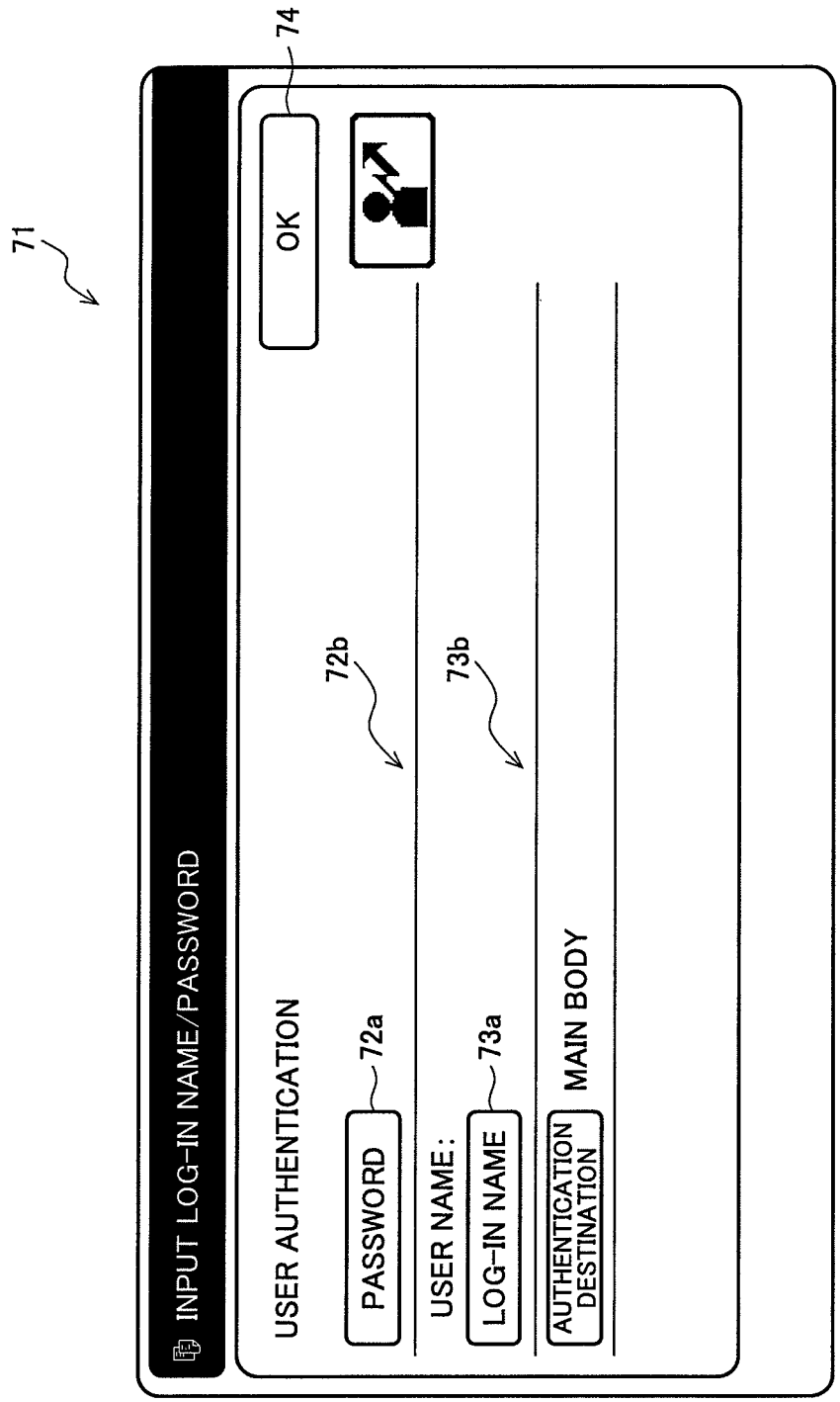
FIG. 10 is a diagram for showing an example of a user authentication screen in the digital multi-functional peripheral explained in FIGS. 2 and 3.

Next, description will be given for processing in a case where a user actually uses the digital multi-functional peripheral 1 in a state where the system setting as described above has been made with reference to FIGS. 10 to 14. Although description will be given mainly with reference to a case of using a copy function, it is similar in other functions. FIG. 10 is a diagram for showing an example of a user authentication screen in the digital multi-functional peripheral explained in FIGS. 2 and 3.

A GUI image 71 shown in FIG. 10 is displayed as a user authentication screen (log-in screen) on the touch panel 32 when the user performs some sort of operation on a key operation portion 31 or the touch panel 32 in an operation panel 30 of FIG. 3. In the GUI image 71, a password input key 72a, a log-in name input key 73, an authentication destination key for changing the authentication destination, an OK key 74, and the like are displayed so as to be selectable.

When the user selects the log-in name input key 73a, a not-shown software keyboard is displayed on the touch panel 32, and an input of a log-in name is possible. The input log-in name is displayed in a column 72b. Similarly, when the user selects the password input key 72a, the software keyboard is displayed, an input of a password is possible, and the input password is displayed in a column 73b. Alternatively, "****" or the like may be displayed instead of a password actually input considering security.

In this way, the user selects the OK key 74 after inputting a log-in name or a password, thus the main control portion 18 refers to the authentication table 19b in the control memory 19 and checks (authenticates) whether the input log-in name and password are correct ones.

Success of authentication means that the digital multi-functional peripheral 1 is able to specify which user is currently operating. Note that, specification of a user is not limited to such an authentication method, for example, user authentication using an IC card or biometric authentication may be employed, or simply an input of a user ID is received by the operation panel 30, and the user may be specified with the input.

Figure 11:
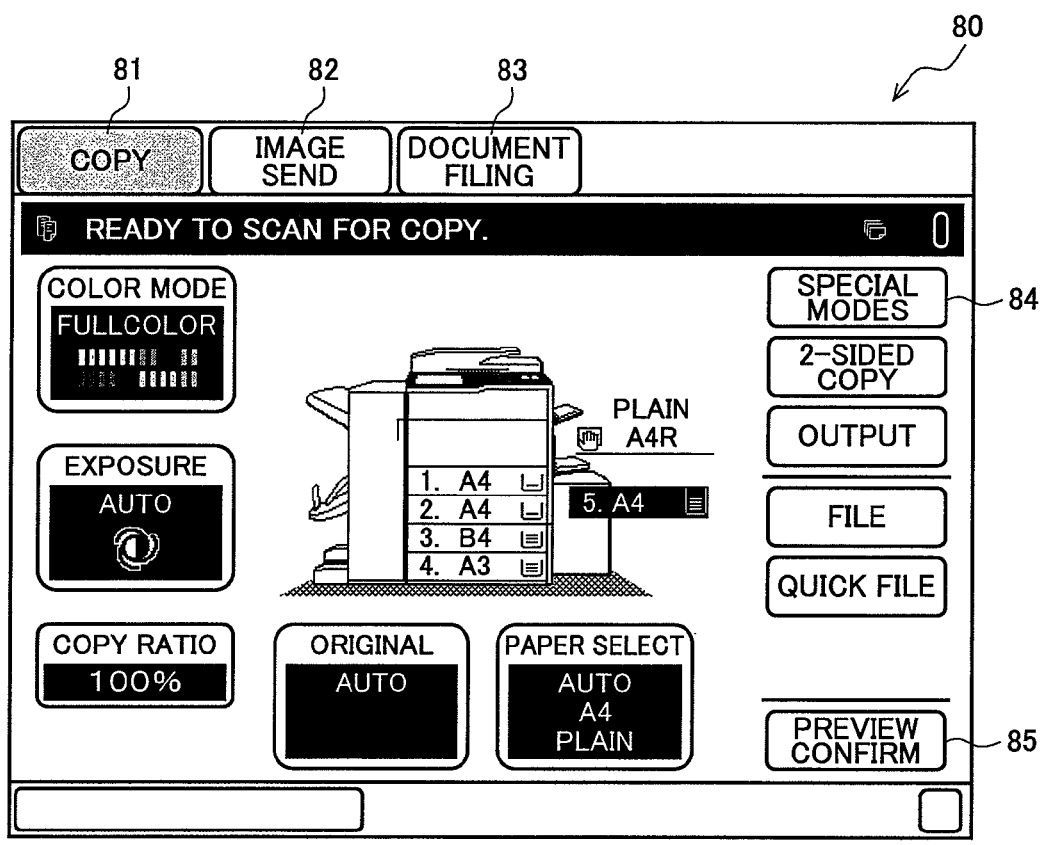
FIG. 11 is a diagram for showing an example of a standard screen in the digital multi-functional peripheral explained in FIGS. 2 and 3.

When the user authentication is successful, a GUI image 80 illustrated in FIG. 11 is displayed on the touch panel 32. FIG. 11 is a diagram for showing an example of a standard screen in the digital multi-functional peripheral explained in FIGS. 2 and 3. The user authentication is successful, therefore, each item of the GUI image 80 is displayed so as to be selectable by a user. Note that, the GUI image 80 of the standard screen is also displayed on the touch panel 32 when a power source of the digital multi-functional peripheral 1 is turned ON or reset.

In the GUI image 80, a copy mode selection key 81, an image send mode selection key 82, and a document filing mode selection key 83 are displayed to select an operation mode of the digital multi-functional peripheral 1, and the GUI image 80 shows a state where the copy mode is selected.

In the copy mode, various condition settings are possible to perform a copy. For example, a 2-sided copy key for performing a setting of 1-sided/2-sided copy, a finish key for performing a setting of post processing such as punching or stapling, a special modes key 84 for performing other detailed settings in copying, a preview confirm key 85 for performing a setting for confirming a finish state of an image read by a scanner, an image input from an external device, or an image stored in a storage apparatus such as HDD or the like, etc., are provided.

The user is able to make an ON setting of a preview display by operating the preview confirm key 85 using the touch panel 32. Note that, the key 82 or the key 83 is selected to shift to an image send mode or a document filing mode, and at this time, a GUI image for setting in each mode is displayed such that various settings in accordance with each mode can be performed.

After setting print conditions, in a state where the GUI image 80 is displayed, when the user sets an original on an ADF or a document table and depresses the start key 31d of FIG. 3, printing processing is started. However, by depressing the start key 31d, first, the main control portion 18 causes the reading portion 13 to read an original. Then, the main control portion 18 refers to the preview setting table 19a, reads setting information (forcible execution information or a display magnification value) on a user being specified (log-in user), and in a case where a user needs a forcible preview display, causes the preview image generating portion 16a to execute generation of a preview image and to display a GUI image as illustrated in FIG. 12 on the touch panel 32.

Figure 12:
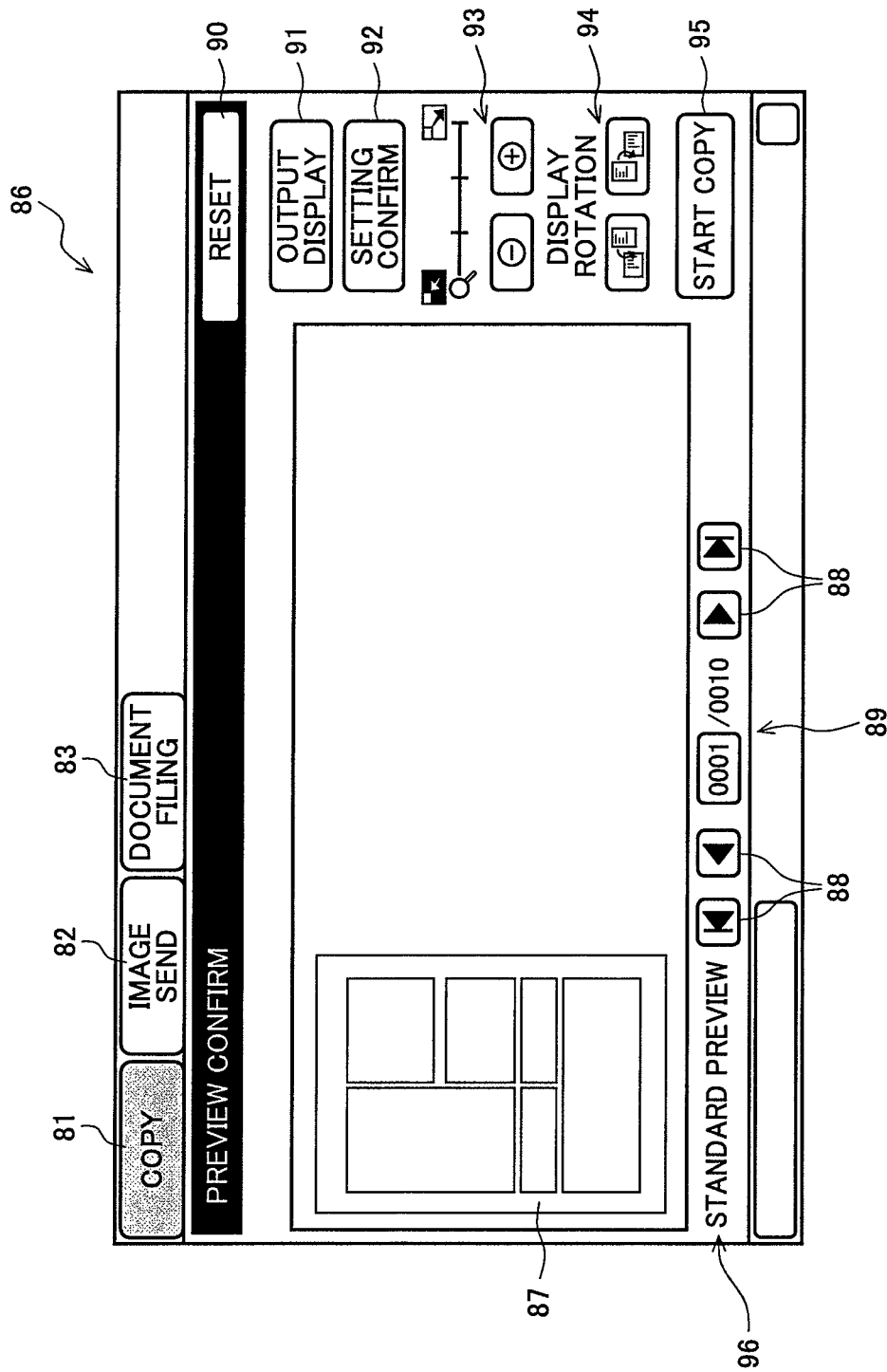
FIG. 12 is a diagram for showing an example of a preview display screen in a copy mode in the digital multi-functional peripheral explained in FIGS. 2 and 3.

FIG. 12 is a diagram for showing an example of a preview display screen in a copy mode in the digital multi-functional peripheral explained in FIGS. 2 and 3. A GUI image 86 shown in FIG. 12 is displayed in a case where a user needs a forcible preview display by a standard magnification in the copy mode (for example, the above user AAA AAA). In the GUI image 86, an image 96 showing that a display is performed in "a standard preview", is displayed.

In the GUI image 86, a preview image 87 generated in a standard magnification by the preview image generating portion 16a from image data to be printed subjected to original reading, is displayed by the panel control portion 11. The preview image 87 shows reduced image data for each page. Therefore, in the GUI image 86, together with information 89 showing a current page, a page switch key 88 is displayed so as to be selectable by a user in order to change a page of image data being displayed for previewing.

The page switch key 88 includes a top page shift key for displaying a first page, a previous page shift key for displaying a page before a current page, a next page shift key for displaying a page next to a current page, and a last page shift key for displaying the last page. The preview image 87 is displayed for each page in this manner and the user is able to display a preview image of an arbitrary page by operating the page switch key 88 appropriately.

In the GUI image 86, a setting confirm key 92, an enlarging/reducing key 93, a display rotation key 94, and the like are further displayed so as to be selectable by a user, and by operating these keys appropriately, the user is able to confirm a setting of the preview image 87 or to confirm by enlarging/reducing or rotating the preview image 87.

In the GUI image 86, the finish display key 91 for displaying a finish state reflecting up to post processing such as stapling and punching is also displayed so as to be selectable. In the GUI image 86, a reset key 90 is also displayed so as to be selectable. When a necessity of resetting print conditions after confirming the preview image 87 arises, the user is able to display a GUI image for resetting the print conditions by operating the reset key 90. Then, it is possible to reset the print conditions using the resetting screen to display the preview image 87 based on the reset print conditions.

In addition, a copy start key 95 is displayed in the GUI image 86 so as to be selectable, and only after the user operates the copy start key 95, processing for performing image formation (printing) of image data displayed for previewing is started. Note that, in facsimile reception, the preview image 87 in the GUI image 86 may also be displayed in the same manner.

Figure 13:
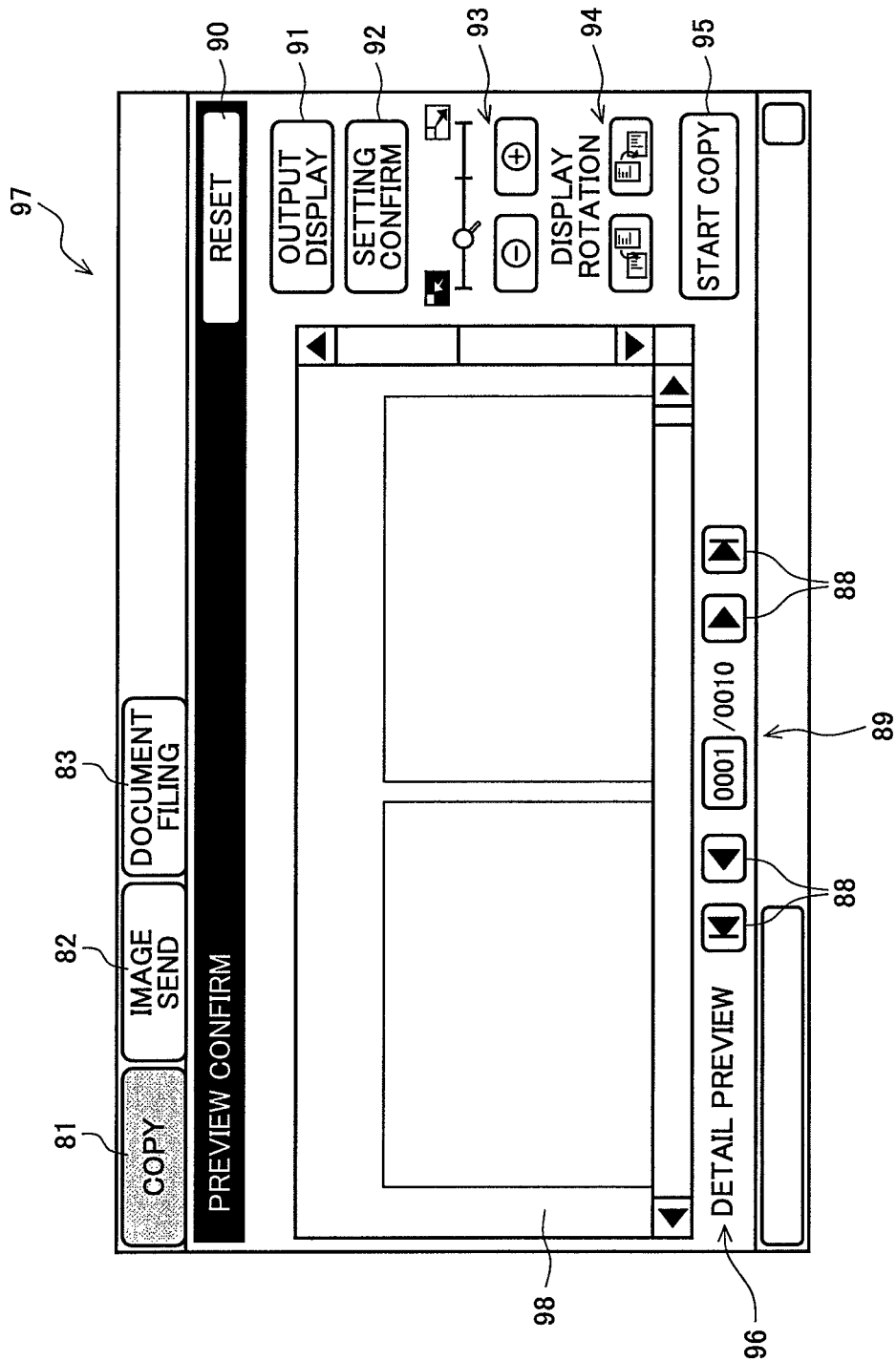
FIG. 13 is a diagram for showing an example of a preview display screen in a copy mode in the digital multi-functional peripheral explained in FIGS. 2 and 3.

The main control portion 18, as a result of referring to the preview setting table 19a and reading a setting information (forcible information and a display magnification value), in a case where a user needs a forcible preview display with a magnification larger than the standard, causes the preview image generating portion 16a to generate a preview image and to display a GUI image as illustrated in FIG. 13 on the touch panel 32.

FIG. 13 is a diagram for showing an example of a preview display screen in a copy mode in the digital multi-functional peripheral explained in FIGS. 2 and 3. A GUI image 97 shown in FIG. 13 is displayed in a case where a user needs a forcible preview display with a magnification larger than the standard magnification in the copy mode (for example, the above user CCC CCC).

In the GUI image 97, a preview image 98 generated in a standard magnification by the preview image generating portion 16a from image data to be printed subjected to original reading, is displayed by the panel control portion 11. In the GUI image 97, a scroll bar is also displayed and confirmation of the whole is possible by a user operation. In addition, in the GUI image 97, the image 96 is an image showing that a display by "a detail preview" is performed. Other parts are similar to the GUI image 86 of FIG. 12.

Figure 14:
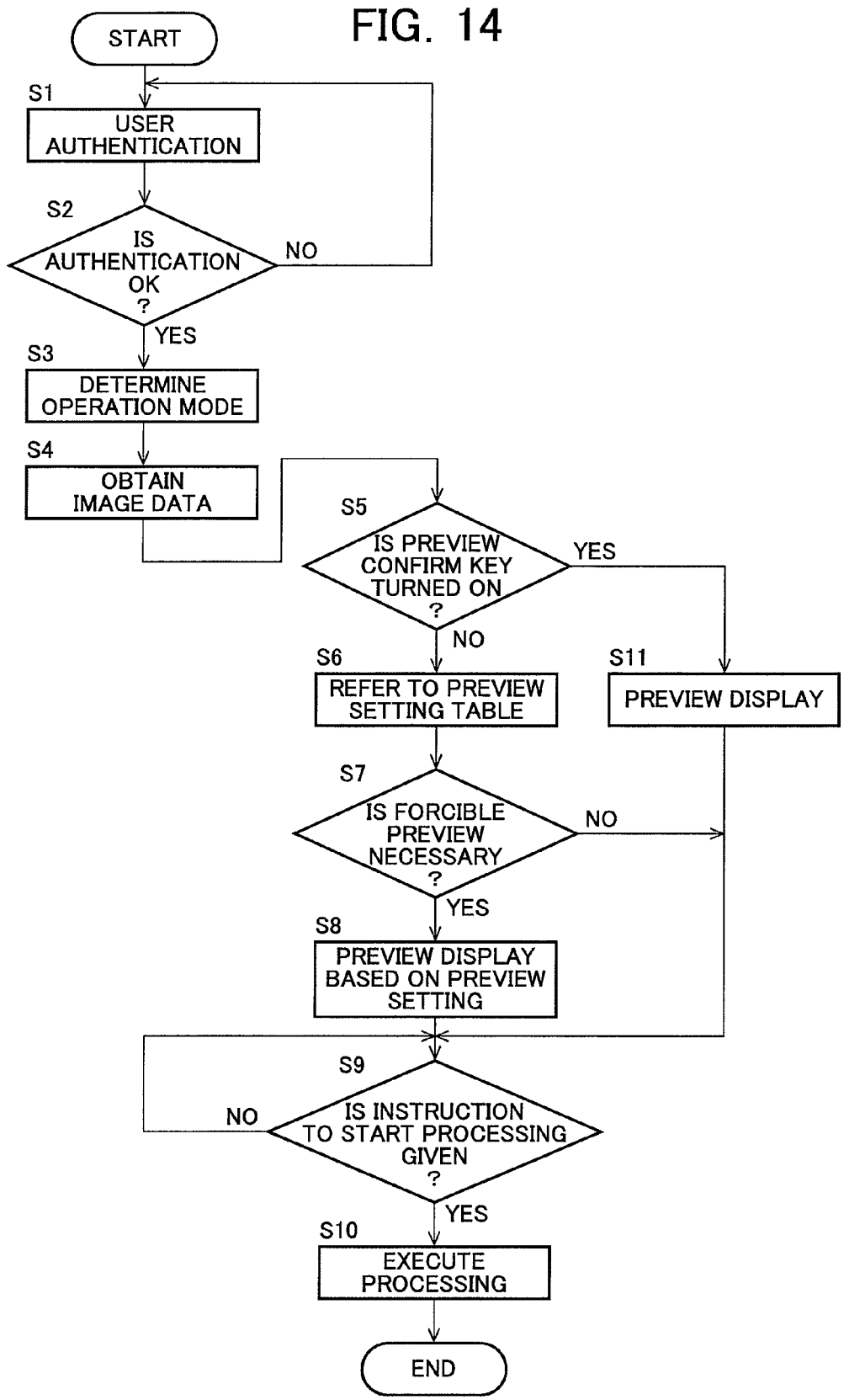
FIG. 14 is a flowchart for explaining an example of a procedure of executing a user-based preview display and output processing in the digital multi-functional peripheral explained FIGS. 2 and 3.

Next, description will be given for an example of a flow when a user-based preview display and output processing are executed with reference to FIG. 14. FIG. 14 is a flowchart for explaining an example of flows to execute the user-based preview display and output processing.

First, the main control portion 18 authenticates a log-in name and a password input from a user with reference to the authentication table 19b (step S1), determines whether or not authentication is successful (step S2), and when the authentication is unsuccessful, waits for another input and repeats authentication until authentication is succeeded.

Subsequently, the main control portion 18 waits for a user operation, determines a current operation mode based on the user operation (step S3), and performs processing such as receiving a setting in accordance with the determined operation mode (for example, printing setting in a copy mode). Subsequently, the main control portion 18 obtains image data that is an object of an output from the reading portion 13 or the image storage portion 15 and gives the data to the image processing portion 16 (step S4).

Next, the main control portion 18 determines whether a setting of preview ON is made with a preview confirm key 85 of FIG. 11 by the user (step S5). Note that, the setting of preview ON is just made by a user and is different from the one made by an administrator and stored as setting information including forcible execution information.

In the case of YES at step S5, the main control portion 18 causes the preview image generating portion 16a to generate a preview image and causes to display the generated preview image on the touch panel 32 the panel control portion 11 (step S11). The preview image displayed here is an image with a prescribed magnification. For example, like in a GUI image 86 (however, an image 96 is not necessary), a preview image 87 may be displayed.

After step S11, the main control portion 18 waits for that an output processing start key in accordance with an operation mode of a copy start key, a send start key, a save start key, or the like is selected (step S9), and executes output processing thereof at the time when an output start instruction is accepted by the selection, (step S10).

On the other hand, in the case of NO at step S5, the main control portion 18 determines whether a user and an operation mode require forcible preview display with reference to the preview setting table 19a (step S7). In the case of YES at step S7, the main control portion 18, displays a preview image like in the GUI image 86 of FIG. 12 or the GUI image 97 of FIG. 13 based on setting information recorded in the preview setting table 19a for the user (step S8). Here, display of the preview image may also be performed by that the preview image is generated by the preview image generating portion 16a and displayed by the panel control portion 11 on the touch panel 32 in a state of being incorporated in the GUI image.

After step S8, each processing of step S9 and S10 is performed. In addition, in the case of NO at step S7, each processing of step S9 and S10 is performed without passing through step S8.

As has been explained at step S5 and branching after determination thereof, the digital multi-functional peripheral 1 is preferably provided with an operation portion for selecting, by a user operation, whether or not a preview image of image data that is the object of the output is displayed by a display control portion. Then the display control portion, only when a selecting operation for not displaying a preview image is performed by an operation portion (including a case where such a setting is made by default), reads stored setting information and performs display control based on the setting information. On the other hand, in a case where displaying a preview is selected by a user operation, the processing for determining necessity/unnecessity of a forcible display is not necessary by performing the preview display as it is.

Figure 15:
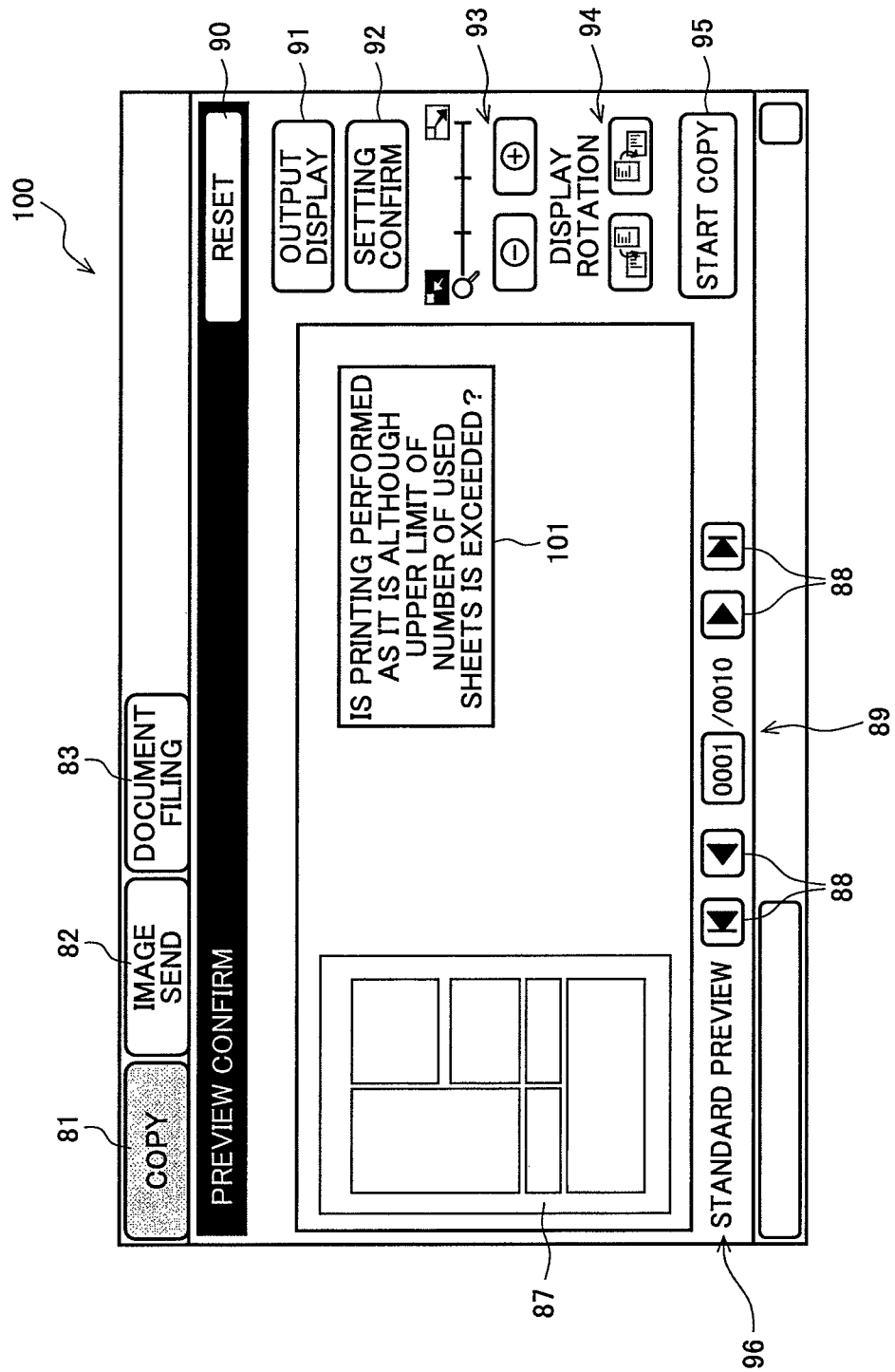
FIG. 15 is a diagram for showing an example of a preview display screen in a copy mode in the digital multi-functional peripheral explained FIGS. 2 and 3.

Description will be given referring to FIG. 15 for another example of processing in a case where a user actually uses the digital multi-functional peripheral 1 in a state where a system setting explained with reference to FIGS. 4 to 9 is made. FIG. 15 is a diagram for showing an example of a preview display screen in a copy mode in the digital multi-functional peripheral explained in FIGS. 2 and 3.

A GUI image 100 shown in FIG. 15 is the one to which a warning (notice) message 101 for a user is added in the GUI image 86 of FIG. 12. In the warning message 101, contents such as "Do you want to continue printing although upper-limit of number of used sheets is exceeded?" is described, and when a user does not want to continue printing, the user can stop the printing by depressing a cancel all key 31c or the like in the operation panel 31 of FIG. 3. On the other hand, when a user needs to continue printing, despite that the warning message 101 is displayed, the user can execute the printing by selecting a copy start key 95.

Such a display of the warning message 101 is convenient in preventing excessive use of sheets. Description will hereinafter be given for a configuration enabling to display the warning message 101. First, the digital multi-functional peripheral 1 is assumed to be capable of printing on sheets. Then the digital multi-functional peripheral 1 is provided with the following an upper-limit of the number of sheets storage portion and a count portion.

A conditions of the number of sheets storage portion is a storage portion that stores an upper-limit of the number of printed sheets for a fixed period (for example, one month, six months, or the like) for each user, and can be illustrated as the control memory 19 and the main control portion 18, for example. By opening a dedicated setting screen similarly to the user-based preview setting, an administrator may make a setting of an upper-limit for each user (group user is possible). The main control portion 18 may store the setting contents in the control memory 19 so as to be readable.

The count portion counts the number of printed sheets for each user for each of the above fixed period. After the fixed period has elapsed, the counting result may be reset. The count portion may be illustrated as the main control portion 18 and the control memory 19 for storing the counting result for each user.

Then, a setting storage portion sets forcible execution information to show that a preview image is forcibly displayed for a user whose number of printed sheets counted by the count portion has exceeded an upper-limit stored in the upper-limit-number storage portion (any setting is possible therebefore). For example, the main control portion 18 may make a setting (setting change) for the preview setting table 19a. In addition, an upper-limit and determination processing in a copy mode only may be employed, and an upper-limit and determination processing in combination with a print mode may be employed.

Then, for the user exceeding the upper-limit, it may be stored in the preview setting table 19a or from the table 19a that exceeding the upper-limit as information that is capable of being associated with. The main control portion 18 reads the record of the user who has exceeded the upper-limit of the number of used sheets, in performing a forcible preview display based on the preview setting table 19a, and combines synthesize the warning message 101 prepared in advance with the GUI image to display a GUI image 100 on the touch panel 32.

With such warning, it is possible to warn a user whose copy used amount is too large of excessive use by performing a preview display. In addition, a setting for a forcible preview display is performed when exceeding the upper-limit may be provided to be handled equally to "+", "*", or the like. In addition, description has been given by assuming that counting is performed irrespective of color/monochrome, however, determination and warning may be performed by using the number of used sheets in color printing, the number of used sheets in monochromatic printing, and upper-limit values thereof, for each of color/monochrome. It is thereby possible to also display a warning message such as prompting to print in monochrome when the number of color sheets exceeds the upper-limit.

In addition, although an example of performing counting of the number of used sheets in a fixed period and comparing with an upper-limit has been taken counting frequency in use within a fixed period and comparison with an upper-limit may be employed instead thereof. It is possible to warn of occupying the digital multi-functional peripheral 1.

In addition, as another embodiment, the digital multi-functional peripheral 1 may be provided with a measuring portion that measures elapsed time from a first use date and time for each user. Then, the setting storage portion, may set such that forcible execution information shows that a preview image is not displayed for a user whose elapsed time from the first use date and time has elapsed a predetermined period (has become the predetermined period or more). For example, the main control portion 18 may make a setting (setting change) for the preview setting table 19a.

In the embodiment, becoming used to the method for using is determined after the predetermined period has passed, and it is possible not to execute a forcible preview display. In addition, instead of the predetermined period, total of the number of used sheets or the number of use is counted differently from the above fixed period, a count value thereof and a threshold value is compared, and when the count value has exceeded the threshold value, becoming used to the method for using is determined, and a setting may be made such that the forcible preview display is not executed.

Next, supplementary description will be given for a preview display of additional information with reference to FIG. 16. FIG. 16 is a diagram for showing an example of a preview display screen in a FAX data send mode in the digital multi-functional peripheral explained FIGS. 2 and 3. A GUI image 102 shown in FIG. 16 is the one at the time of the FAX data send mode instead of the copy mode in the GUI image 86 of FIG. 12, an image send mode 82 is selected, and a send start key 104 instead of a copy start key 95 is displayed so as to be selectable by a user.

In a GUI image 102, header information 103 is added to a header part of the preview image 98. The header information 103 is displayed when a user sets to send by adding therewith in a send setting. In this way, in the case of a mode to send data to outside such as a FAX data send mode, additional information like header information 103 is added in many cases, and necessity of sending after confirming whether the additional information is not wrong is high.

Accordingly, it is preferable to employ not "+" but "*" for a setting of the user BBB BBB of FIGS. 8 and 9. In addition, not only a preview display magnification, but also other display setting values (a first display position, for example) may be settable for each user and for each operation mode. Processing such as setting a display position of a preview image such that the header information 103 can be viewed, is thereby possible.

Although description has been given for the image forming apparatus according to the present invention with reference to the digital multi-functional peripheral 1, as described in the flow of processing thereof, the present invention may employ a form as a preview display method in the image forming apparatus (illustrated as the above-described digital multi-functional peripheral 1). The digital multi-functional peripheral 1 is provided with a display portion, the preview image generating portion that generates a preview image of image data that is an object of the output, and the display control portion that displays the preview image generated by the preview image generating portion on the display portion as described above.

The preview display method according to the present invention is provided with a step in which a setting storage portion stores, for each user, setting information related to a preview display by a display control portion that includes forcible execution information showing whether or not a preview image is forcibly displayed by the display control portion and a step in which the display control portion performs display control based on setting information stored in the setting storage portion. Note that, an application example of the preview display method is as described in the preview display processing in the digital multi-functional peripheral 1, with description thereof omitted.

According to the present invention, the image forming apparatus is configured such that information related to a preview display can be set for each user, therefore, it is possible to cause a user to get used to an operation of the apparatus while preventing from executing unnecessary output by a preview display before outputting, and to eliminate trouble of a preview display for a user skilled in the operation of the apparatus.

The invention claimed is:

1. An image forming apparatus comprising:
a display portion,
a preview image generating portion that generates a preview image of image data to be output,
a display control portion that displays the preview image generated by the preview image generating portion on the display portion, and
a setting storage portion that stores, for each user, setting information related to a preview display by the display control portion, wherein the setting information includes forcible execution information showing whether or not the preview image is forcibly displayed by the display control portion, and in which the display control portion performs display control based on the setting information stored in the setting storage portion, wherein
the image forming apparatus is capable of printing on sheets and comprises:
an upper-limit-number storage portion that stores, for each user, an upper limit number of printed sheets or number of printing every fixed period, and
a count portion that counts the number of printed sheets or the number of printing for each user every fixed period, and
the setting storage portion sets the forcible execution information so that the preview image is forcibly shown to a user that causes the total number of printed sheets or the number of printing counted by the count portion to exceed the upper-limit-number stored in the upper-limit-number storage portion.

2. The image forming apparatus as defined in claim 1 comprising:
an operation portion that prompts a user to select whether or not the preview image of the image data to be output is displayed by the display control portion, wherein
the display control portion, reads the setting information stored in the setting storage portion, and performs display control based on the setting information read only when the user selects no preview image displayed by the operation portion.

3. The image forming apparatus as defined in claim 1, wherein
the upper-limit-number storage portion stores, for each user, an upper limit number of color printed sheets or number of color prints every fixed period and an upper limit of a number of monochrome printed sheets or a number of monochrome prints every fixed period as the upper limit number of printed sheets or number of printing every fixed period,
the count portion counts separately the number of color printed sheets or the number of color prints every fixed period and the number of monochrome printed sheets or the number of monochrome prints every fixed period as the number of printed sheets or the number of printing every fixed period, and
the display control portion forcibly displays the preview image to a user that causes the number of color printed sheets or the number of color prints every fixed period or the number of monochrome printed sheets or the number of monochrome prints every fixed period which are counted by the count portion to exceed the upper-limit number stored in the upper-limit-number storage portion.

4. The image forming apparatus as defined in claim 1, wherein
the upper-limit-number storage portion stores, for each user, an upper limit number of color printed sheets or number of color prints every fixed period as the upper limit number of printed sheets or number of printing every fixed period,
the count portion counts separately the number of color printed sheets or the number of color prints every fixed period as the number of printed sheets or the number of printing every fixed period, and
the display control portion forcibly displays the preview image to a user that causes the number of color printed sheets or the number of color prints every fixed period, counted by the count portion to exceed the upper-limit-number stored in the upper-limit-number storage portion as well as a message prompting to execute monochrome printing.

5. The image forming apparatus as defined in claim 1, wherein
the image forming apparatus has a copy function and a print function,
the number of printed sheets is a number that combines a number of printed sheets used by copying and a number of printed sheets used by printing, and the number of printing is a number that combines a number of printing executed by copying in and a number of printing executed by printing.

6. The image forming apparatus as defined in claim 1, wherein
the display control portion displays a warning indicating that the upper limit of the number of printed sheets or the number of printing is exceeded, at the same time when forcibly displaying the preview image.

7. An image forming apparatus comprising:
a display portion,
a preview image generating portion that generates a preview image of image data to be output,
a display control portion that displays the preview image generated by the preview image generating portion on the display portion, and
a setting storage portion that stores, for each user, setting information related to a preview display by the display control portion, wherein the setting information includes forcible execution information showing whether or not the preview image is forcibly displayed by the display control portion, and wherein the display control portion performs display control based on the setting information stored in the setting storage portion, wherein the image forming apparatus comprises a measuring portion that measures elapsed time from date and time of first use, or total number of used sheets, or total number of use for each user, and the setting storage portion sets the forcible execution information so that the preview image is not shown to a user that causes the elapsed time to be over a predetermined length, or to a user that causes the total number of used sheets to exceed a predetermined number of sheets, or to a user that causes the total number of use to exceed a predetermined number of use.

8. The image forming apparatus as defined in claim 7, comprising:

an operation portion that prompts a user to select whether or not the preview image of the image data to be output is displayed by the display control portion, wherein the display control portion, reads the setting information stored in the setting storage portion, and performs display control based on the setting information read only when the user selects no preview image displayed by the operation portion.

9. A preview display method in an image forming apparatus which is capable of printing on sheets, having a display portion, a preview image generating portion that generates a preview image of image data to be output, and a display control portion that displays the preview image generated by the preview image generating portion on the display portion, including:

a step in which a setting storage portion of the image forming apparatus stores, for each user, setting information that is related to a preview display by the display control portion and includes forcible execution information showing whether or not the preview image is forcibly displayed by the display control portion;

a step in which an upper-limit-number storage portion of the image forming apparatus stores an upper limit number of printed sheets or number of printing for a fixed period for each user;

a step in which a count portion of the image forming apparatus counts the number of printed sheets or the number of printing for each user for the fixed period;

a step in which the setting storage portion sets the forcible execution information so that the preview image is forcibly shown to a user that causes the number of printed sheets or the number of printing counted by the count portion to exceed the upper-limit number stored in the upper-limit-number storage portion; and a step in which the display control portion performs display control based on the setting information stored in the setting storage portion.

10. A preview display method in an image forming apparatus, having a display portion, a preview image generating portion that generates a preview image of image data to be output, and a display control portion that displays the preview image generated by the preview image generating portion on the display portion, including:

a step in which a setting storage portion of the image forming apparatus stores, for each user, setting information that is related to a preview display by the display control portion and includes forcible execution information showing whether or not the preview image is forcibly displayed by the display control portion;

a step in which a measuring portion of the image forming apparatus measures elapsed time from date and time of first use, or a total number of the used sheets, or a total number of use for each user;

a step in which the setting storage portion sets the forcible execution information so that the preview image is not shown to a user that causes the elapsed time to be over a predetermined length, or to a user that causes the number of used sheets to exceed the predetermined number of sheets, or to a user that causes the number of use to exceed the predetermined number of use; and a step in which the display control portion performs display control based on the setting information stored in the setting storage portion.

* * * * *